(12) United States Patent
Kojima et al.

(10) Patent No.: US 12,417,025 B2
(45) Date of Patent: *Sep. 16, 2025

(54) NONVOLATILE MEMORY INCLUDING INTERMEDIATE BUFFER AND INPUT/OUTPUT BUFFER AND MEMORY SYSTEM INCLUDING THE NONVOLATILE MEMORY

(71) Applicant: KIOXIA CORPORATION, Tokyo (JP)

(72) Inventors: Yoshihisa Kojima, Kawasaki (JP); Masanobu Shirakawa, Chigasaki (JP); Kiyotaka Iwasaki, Yokohama (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,159

(22) Filed: Feb. 2, 2024

(65) Prior Publication Data

US 2024/0176490 A1 May 30, 2024

Related U.S. Application Data

(63) Continuation of application No. 17/982,840, filed on Nov. 8, 2022, now Pat. No. 11,941,251, which is a continuation of application No. 17/332,117, filed on May 27, 2021, now Pat. No. 11,543,969, which is a continuation of application No. 16/560,200, filed on Sep. 4, 2019, now Pat. No. 11,068,167.

(30) Foreign Application Priority Data

Sep. 18, 2018 (JP) ................ 2018-174120

(51) Int. Cl.
*G06F 3/06* (2006.01)

(52) U.S. Cl.
CPC .......... *G06F 3/0611* (2013.01); *G06F 3/0656* (2013.01); *G06F 3/0659* (2013.01); *G06F 3/0679* (2013.01)

(58) Field of Classification Search
CPC .... G06F 3/0611; G06F 3/0679; G06F 3/0659; G06F 3/0656
See application file for complete search history.

(56) References Cited

U.S. PATENT DOCUMENTS

2006/0245247 A1 11/2006 Yano et al.
2012/0026791 A1 2/2012 Li
2015/0200015 A1 7/2015 Kim
(Continued)

*Primary Examiner* — Mark A Giardino, Jr.
(74) *Attorney, Agent, or Firm* — Oblon, McClelland, Maier &Neustadt, L.L.P.

(57) ABSTRACT

According to one embodiment, there is provided a nonvolatile memory including a memory cell array, an input/output buffer, one or more intermediate buffers, and a control circuit. The memory cell array includes a plurality of pages. Each of the one or more intermediate buffers is electrically connected between the memory cell array and the input/output buffer. The control circuit is configured to store, in a first intermediate buffer, data read through sensing operation from a first page out of the plurality of pages in accordance with a first command that includes a sensing operation instruction and designation of the first intermediate buffer among the one or more intermediate buffers.

20 Claims, 17 Drawing Sheets

(56) References Cited

U.S. PATENT DOCUMENTS

2018/0018233 A1* 1/2018 Kim .................... G06F 11/1096
2019/0087101 A1    3/2019 Endo
2019/0252027 A1* 8/2019 Shin ....................... G11C 16/26

* cited by examiner

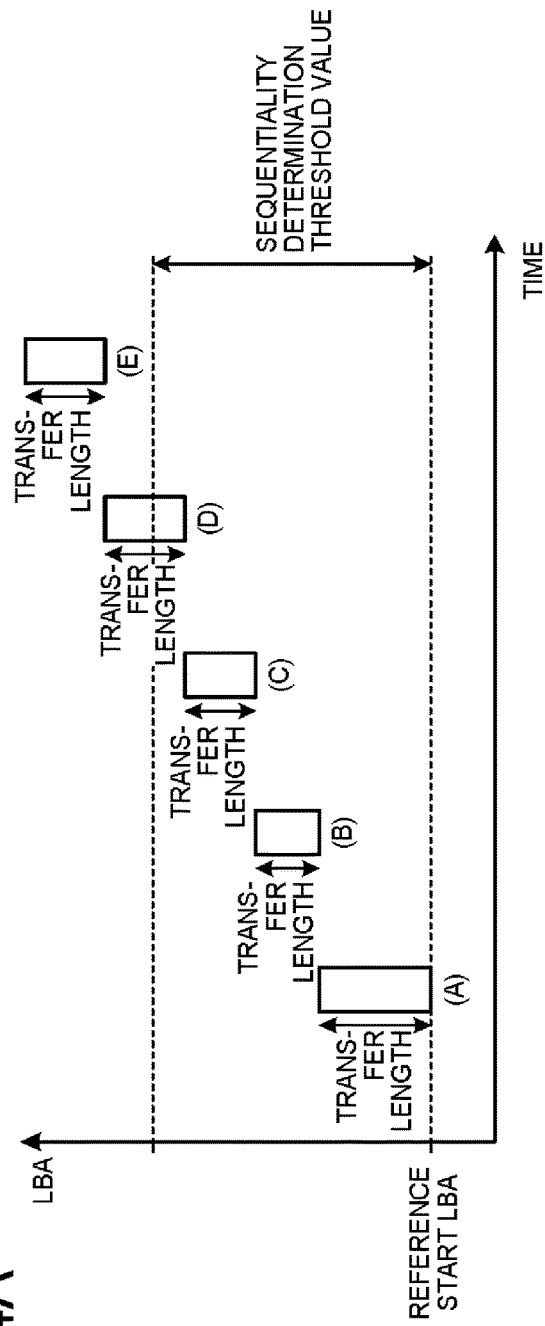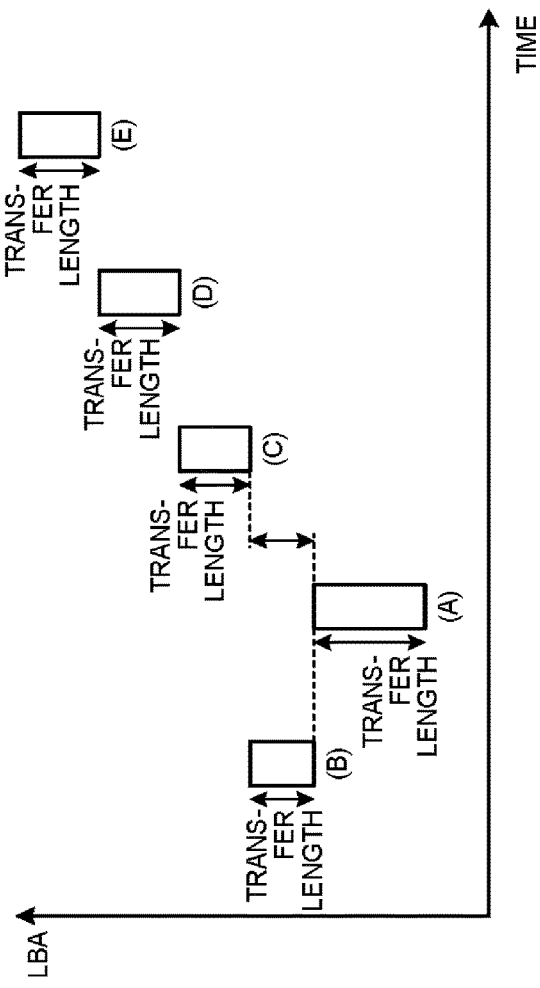

FIG.15A

| No | START LBA | LAST LBA | CUMU-LATIVE LENGTH | GEN-ERA-TION NO. |
|---|---|---|---|---|
| 0 | | | | |
| 1 | | | | |
| 2 | | | | |

SEQUENTIALITY DETERMINATION FLAG = 0

FIG.15B ↓ READ COMMAND A  START LBA = 0x1000  TRANSFER LENGTH = 0x200

| No | START LBA | LAST LBA | CUMU-LATIVE LENGTH | GEN-ERA-TION NO. |
|---|---|---|---|---|
| 0 | 0x1000 | 0x11FF | 0x200 | 1 |
| 1 | | | | |
| 2 | | | | |

SEQUENTIALITY DETERMINATION FLAG = 0

FIG.15C ↓ READ COMMAND B  START LBA = 0x1200  TRANSFER LENGTH = 0x100

| No | START LBA | LAST LBA | CUMU-LATIVE LENGTH | GEN-ERA-TION NO. |
|---|---|---|---|---|
| 0 | 0x1000 | 0x12FF | 0x300 | 1 |
| 1 | | | | |
| 2 | | | | |

SEQUENTIALITY DETERMINATION FLAG = 0

FIG.15D ↓ READ COMMAND C  START LBA = 0x1400  TRANSFER LENGTH = 0x200

| No | START LBA | LAST LBA | CUMU-LATIVE LENGTH | GEN-ERA-TION NO. |
|---|---|---|---|---|
| 0 | 0x1000 | 0x12FF | 0x300 | 2 |
| 1 | 0x1400 | 0x15FF | 0x200 | 1 |
| 2 | | | | |

SEQUENTIALITY DETERMINATION FLAG = 0

READ COMMAND D  START LBA = 0x0E00  TRANSFER LENGTH = 0x100

FIG.15E

| No | START LBA | LAST LBA | CUMU-LATIVE LENGTH | GEN-ERA-TION NO. |
|---|---|---|---|---|
| 0 | 0x1000 | 0x12FF | 0x300 | 3 |
| 1 | 0x1400 | 0x15FF | 0x200 | 2 |
| 2 | 0x0E00 | 0x0EFF | 0x100 | 1 |

SEQUENTIALITY DETERMINATION FLAG = 0

FIG.15F ↓ READ COMMAND E  START LBA = 0x1300  TRANSFER LENGTH = 0x100

| No | START LBA | LAST LBA | CUMU-LATIVE LENGTH | GEN-ERA-TION NO. |
|---|---|---|---|---|
| 0 | 0x1000 | 0x15FF | 0x600 | 1 |
| 1 | | | | |
| 2 | 0x0E00 | 0x0EFF | 0x100 | 2 |

SEQUENTIALITY DETERMINATION FLAG = 0

FIG.15G ↓ READ COMMAND F  START LBA = 0x0F00  TRANSFER LENGTH = 0x100

| No | START LBA | LAST LBA | CUMU-LATIVE LENGTH | GEN-ERA-TION NO. |
|---|---|---|---|---|
| 0 | | | | |
| 1 | | | | |
| 2 | 0x0E00 | 0x15FF | 0x800 | 1 |

SEQUENTIALITY DETERMINATION FLAG = 1

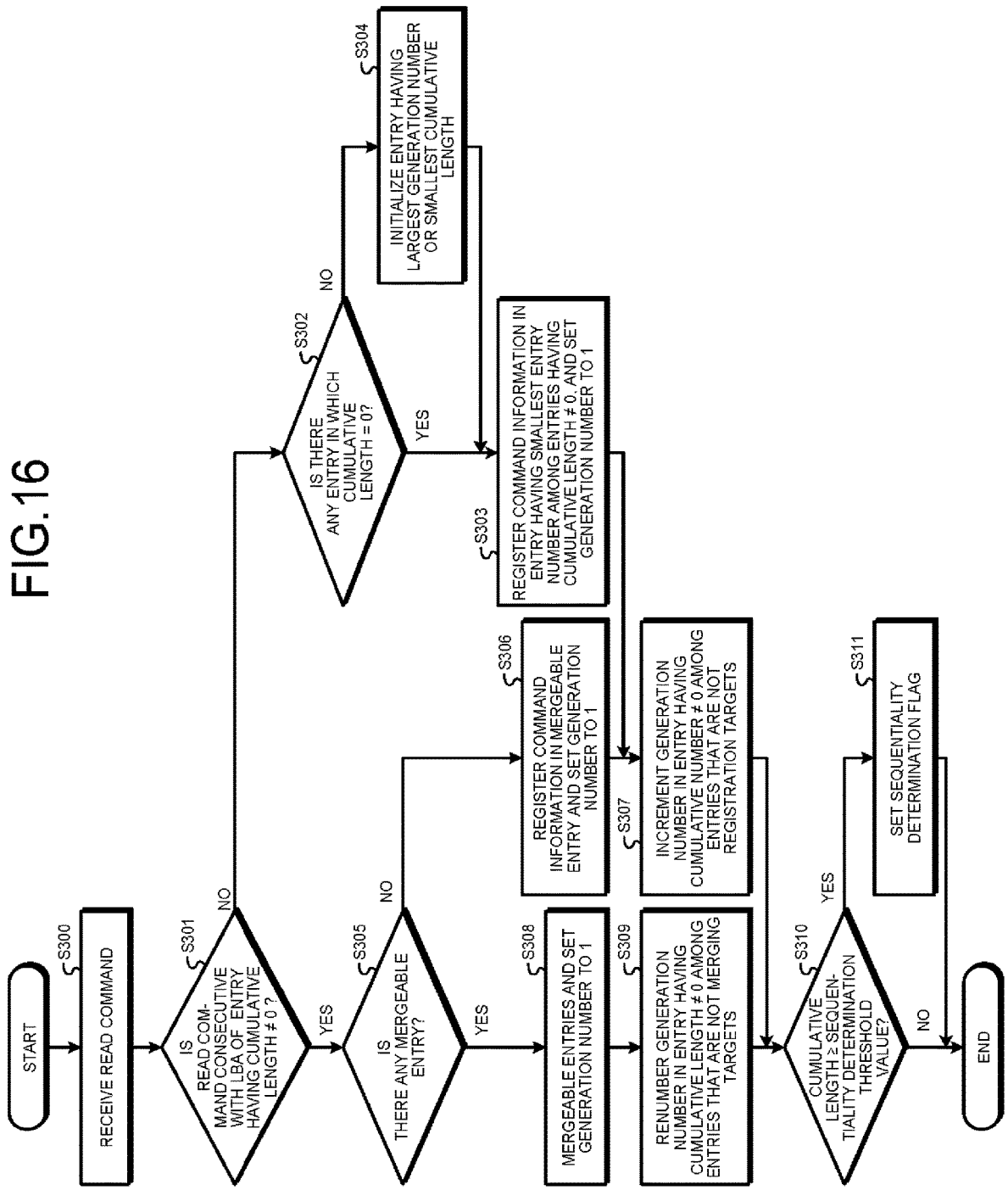

FIG.17A

| No | START LBA | LAST LBA | CUMU-LATIVE LENGTH | GEN-ERA-TION NO. | ID |
|---|---|---|---|---|---|
| 0 | | | | | |
| 1 | | | | | |
| 2 | | | | | |

↓ READ COMMAND A
START LBA = 0x1000
TRANSFER LENGTH = 0x200

FIG.17B

| No | START LBA | LAST LBA | CUMU-LATIVE LENGTH | GEN-ERA-TION NO. | ID |
|---|---|---|---|---|---|
| 0 | 0x1000 | 0x11FF | 0x200 | 1 | |
| 1 | | | | | |
| 2 | | | | | |

↓ READ COMMAND B
START LBA = 0x1200
TRANSFER LENGTH = 0x100

FIG.17C

| No | START LBA | LAST LBA | CUMU-LATIVE LENGTH | GEN-ERA-TION NO. | ID |
|---|---|---|---|---|---|
| 0 | 0x1000 | 0x12FF | 0x300 | 1 | |
| 1 | | | | | |
| 2 | | | | | |

↓ READ COMMAND C
START LBA = 0x1400
TRANSFER LENGTH = 0x200

FIG.17D

| No | START LBA | LAST LBA | CUMU-LATIVE LENGTH | GEN-ERA-TION NO. | ID |
|---|---|---|---|---|---|
| 0 | 0x1000 | 0x12FF | 0x300 | 2 | |
| 1 | 0x1400 | 0x15FF | 0x200 | 1 | |
| 2 | | | | | |

↓ READ COMMAND D
START LBA = 0x0E00
TRANSFER LENGTH = 0x100

FIG.17E

| No | START LBA | LAST LBA | CUMU-LATIVE LENGTH | GEN-ERA-TION NO. | ID |
|---|---|---|---|---|---|
| 0 | 0x1000 | 0x12FF | 0x300 | 3 | |
| 1 | 0x1400 | 0x15FF | 0x200 | 2 | |
| 2 | 0x0E00 | 0x0EFF | 0x100 | 1 | |

↓ READ COMMAND E
START LBA = 0x1300
TRANSFER LENGTH = 0x100

FIG.17F

| No | START LBA | LAST LBA | CUMU-LATIVE LENGTH | GEN-ERA-TION NO. | ID |
|---|---|---|---|---|---|
| 0 | 0x1000 | 0x15FF | 0x600 | 1 | |
| 1 | | | | | |
| 2 | 0x0E00 | 0x0EFF | 0x100 | 2 | |

↓ READ COMMAND F
START LBA = 0x2000
TRANSFER LENGTH = 0x200

FIG.17G

| No | START LBA | LAST LBA | CUMU-LATIVE LENGTH | GEN-ERA-TION NO. | ID |
|---|---|---|---|---|---|
| 0 | 0x1000 | 0x15FF | 0x600 | 2 | |
| 1 | 0x2000 | 0x21FF | 0x200 | 1 | |
| 2 | 0x0E00 | 0x0EFF | 0x100 | 3 | |

↓ READ COMMAND G
START LBA = 0x0F00
TRANSFER LENGTH = 0x100

FIG.17H

| No | START LBA | LAST LBA | CUMU-LATIVE LENGTH | GEN-ERA-TION NO. | ID |
|---|---|---|---|---|---|
| 0 | | | | | |
| 1 | 0x2000 | 0x21FF | 0x200 | 2 | |
| 2 | 0x0E00 | 0x15FF | 0x800 | 1 | 1 |

NONVOLATILE MEMORY INCLUDING INTERMEDIATE BUFFER AND INPUT/OUTPUT BUFFER AND MEMORY SYSTEM INCLUDING THE NONVOLATILE MEMORY

CROSS-REFERENCE TO RELATED APPLICATIONS

This application is a continuation of and claims benefit under 35 U.S.C. § 120 to U.S. application Ser. No. 17/982,840, filed on Nov. 8, 2022, which is a continuation of and claims benefit under 35 U.S.C. § 120 to U.S. application Ser. No. 17/332,117, filed on May 27, 2021, which is a continuation of and claims benefit under 35 U.S.C. § 120 to U.S. application Ser. No. 16/560,200, filed on Sep. 4, 2019, which is based upon and claims the benefit of priority under 35 U.S.C. § 119 to Japanese Patent Application No. 2018-174120, filed on Sep. 18, 2018, the entire contents of each of which are incorporated herein by reference.

FIELD

Embodiments described herein relate generally to a nonvolatile memory and a memory system.

BACKGROUND

In a nonvolatile memory such as a NAND flash memory, when a command is received, processing in accordance with the received command is performed. At this time, it is desired to shorten a time from reception of the command to completion of the processing in accordance with the command in the nonvolatile memory.

BRIEF DESCRIPTION OF THE DRAWINGS

FIGS. 14A and 14B are schematic diagrams to describe algorithms in order to determine sequentiality of read commands in a first modified example of the embodiment;

FIGS. 15A to 15G are diagrams to describe operation to determine sequentiality in the first modified example of the embodiment;

FIG. 16 is a flowchart to describe an updating procedure of a sequentiality determination table in the first modified example of the embodiment; and FIGS. 17A to 17H are diagrams to describe operation to determine sequentiality in a second modified example of the embodiment.

DETAILED DESCRIPTION

Figure 1:
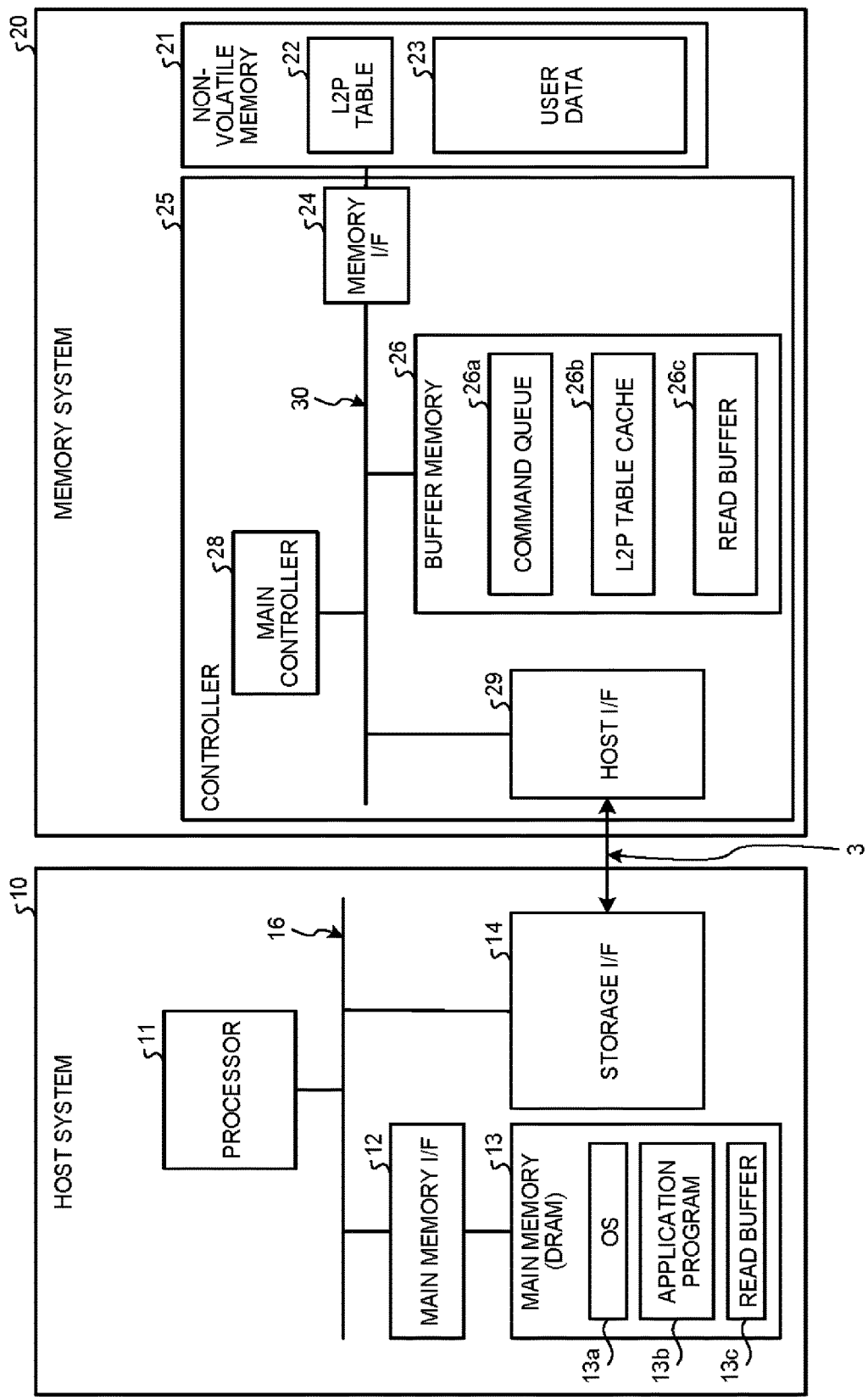
FIG. 1 is a diagram illustrating a configuration of an information processing system to which a memory system according to an embodiment is applied.

In general, according to one embodiment, there is provided a nonvolatile memory including a memory cell array, an input/output buffer, one or more intermediate buffers, and a control circuit. The memory cell array includes a plurality of pages. Each of the one or more intermediate buffers is electrically connected between the memory cell array and the input/output buffer. The control circuit is configured to store, in a first intermediate buffer, data read through sensing operation from a first page out of the plurality of pages in accordance with a first command that includes a sensing operation instruction and designation of the first intermediate buffer among the one or more intermediate buffers.

Exemplary embodiments of a memory system will be explained below in detail with reference to the accompanying drawings. The present invention is not limited to the following embodiments.

EMBODIMENT

A memory system according to an embodiment will be described. The memory system includes a nonvolatile memory such as a NAND flash memory and can perform an operation using the nonvolatile memory in accordance with a command from a host (i.e., a host command). The memory system stores data in the nonvolatile memory in accordance with a write command from the host, and reads the data from the nonvolatile memory in accordance with to a read command from the host.

For example, in a case where a memory system 20 receives a write command (sequential write command) including a logical address sequential to a logical address included in a preceding write command, the nonvolatile memory stores write data corresponding to the write command in a physical address sequential to a physical address in which data has been written in accordance with the preceding write command.

In a case where the memory system receives, for example, a read command including a logical address (a sequential read command) sequential to a logical address included in a preceding read command in a state where the sequential writing is performed in the nonvolatile memory, the nonvolatile memory reads read data corresponding to the read command, via the input/output buffer (data latch used for input/output), from a physical address sequential to a physical address in which the data has been read in accordance with the preceding read command.

The nonvolatile memory includes a memory cell array in which memory cells are arrayed in a matrix, and the input/output buffer has a data capacity of one page corresponding to one row in the memory cell array. When data requested by a sequential read command is located next to data requested by a last read command in an identical page, sensing operation from the memory cell array is omitted and transfer operation from the data stored in the input/output buffer can be performed, and it is possible to accelerate the transfer operation in accordance with the read request.

However, since the number of sense results that can be held in the input/output buffer is the capacity of one page, in a case where the memory system receives, in parallel (concurrently), sequential read commands of a plurality of threads described later, sequential read accesses of the plurality of threads may thrash sense results one another inside the input/output buffer (such a phenomenon is referred to as thrashing), the sensing operation may have to be performed again, and it may be difficult to accelerate the reading operation.

Accordingly, in the present embodiment, a plurality of intermediate buffers is allocated to a plurality of threads in the nonvolatile memory, and data is stored in an intermediate buffer, out of the plurality of intermediate buffers, explicitly designated by a command. Then, the data is transferred from the intermediate buffer designated by the command to the input/output buffer, and is output from the nonvolatile memory to a controller. Consequently, it is possible to achieve acceleration of the transfer operation for the sequential read commands with the plurality of threads.

Specifically, in the nonvolatile memory, when the sensing operation is performed (from memory cell array to data latch) in accordance with a read command from the host system, a sensed result is stored in an intermediate buffer (e.g., one of an ADL and a BDL) designated by the controller. Also, prior to data output from the nonvolatile memory to the controller, inter-latch transfer of the sense result is performed from the intermediate buffer (e.g., one of the ADL and the BDL) to the input/output buffer (i.e., XDL). When sequential read accesses of a plurality of threads are detected, the controller designates one intermediate buffer (e.g., one of the ADL and the BDL) allocated for each of the threads in a memory chip of the nonvolatile memory, and performs the read operation (sensing and data output). In the present embodiment, since the intermediate buffer (e.g., one of the ADL and the BDL) is provided in order to perform program operation and not used during the conventional read processing, the intermediate buffer is utilized to perform operation in the read processing.

The nonvolatile memory includes a plurality of intermediate buffers (e.g., the ADL and the BDL) and supports following commands (1) and (2).
  (1) Sensing command including explicit designation of a storage destination (e.g., one of the ADL and the BDL) (from memory cell array to sense amplifier and from sense amplifier to ADL or BDL)
  (2) Inter-latch data transfer command including explicit designation of a transfer source (from ADL or BDL to XDL)

Additionally, the controller of the memory system performs following operation (i), (ii), and (iii).
  (i) Detect sequential read accesses of a plurality of threads and allocate an intermediate buffer (e.g., one of the ADL and the BDL) for each of the threads.
  (ii) Designate, as a storage destination, an intermediate buffer (e.g., one of the ADL and the BDL) corresponding to each thread, and issue a sensing command (in other words, provide an instruction to perform the sensing operation) at the time of sensing.
  (iii) Provide an instruction of inter-latch transfer to the XDL from the intermediate buffer (e.g., one of the ADL and the BDL) corresponding to each thread, prior to data output operation (i.e., prior to data transfer from the XDL to the controller).

Consequently, there is no extra sensing operation caused by thrashing sense results even in the case of receiving the sequential read commands of the plurality of threads, and high performance can be exerted.

Alternatively, as for a read buffer of the controller, it is possible to reduce a capacity necessary to exert equivalent performance.

More specifically, an information processing system 1 to which the memory system 20 is applied may have a configuration as illustrated in FIG. 1. FIG. 1 is a diagram illustrating the configuration of the information processing system 1 to which the memory system 20 is applied. The information processing system 1 includes a host system 10, a communication line 3, and the memory system 20.

The memory system 20 is connected to the host system 10 via the communication line 3 and functions as an external storage device of the host system 10. The memory system 20 is an embedded flash memory conforming to the Universal Flash Storage (UFS) standard, the Embedded MultiMedia-Card (eMMC) standard, or the like, and is a solid state drive (SSD) or the like. The host system 10 is, for example, a personal computer, a mobile phone, an imaging device, or the like. The host system 10 and the memory system 20 can exchange, via the communication path 3, packets conforming to, for example, the universal flash storage (UFS) standards, the serial attached SCSI (SAS) standards, the serial advanced technology attachment (SATA) standards, the peripheral component interconnect express (PCIe) standards, and the non-volatile memory express (NVMe) standards.

The host system 10 includes a processor 11, a main memory interface (main memory I/F) 12, a main memory 13, a storage interface (storage I/F) 14, and a bus 16 connecting these components. The main memory I/F 12 is an interface to connect the main memory 13 to the bus 16.

The main memory 13 is a main storage device accessible by the processor 11, and is implemented with a dynamic random access memory (DRAM) in the present example. The main memory 13 includes a read buffer 13c. The read buffer 13c temporarily stores read data transferred from the memory system 20 in accordance with a read command. Additionally, the main memory 13 stores, for example, an operating system (OS) 13a and an application program 13b. The OS 13a functions as a control program of the host system 10. The application program 13b functions as a user application program running on the OS 13a.

The storage I/F 14 is an interface to establish connection to the memory system 20. The storage I/F 14 executes data transfer control between the main memory 13 and a register in the storage I/F 14.

The processor 11 is a processor to control operation of the host system 10 and executes the OS 13a loaded in the main memory 13. The OS 13a includes a device driver that controls the memory system 20. When a read instruction for the memory system 20 is received from the application program 13b on the OS 13a, the device driver issues a read command in accordance with the read instruction. The read command issued by the device driver includes a field that identifies a kind of a command (read or write), a field that designates a head LBA, a field that designates a read data size, and the like. Then, the device driver transmits the issued read command to the memory system 20 via the storage I/F 14 and the communication path 3.

The memory system 20 includes a nonvolatile memory 21 and a controller 25. The controller 25 may be implemented as a controller package including, for example, a system-on-a-chip (SoC). The controller 25 includes a memory interface (memory I/F) 24, a buffer memory 26, a main controller 28, and a host interface (host I/F) 29.

The nonvolatile memory 21 is arranged outside the controller 25, and may be implemented as a nonvolatile memory package. The nonvolatile memory 21 may be, for example, a NAND flash memory but not limited thereto. The nonvolatile memory 21 may also be a resistance random access memory (ReRAM), a phase change RAM (PRAM), a magnetoresistive random access memory (MRAM), or a ferroelectric random access memory (FeRAM).

The nonvolatile memory 21 includes a plurality of blocks. Each block is a unit of data erasing. Each block includes a plurality of memory cells. In the memory cell array, a plurality of memory cells is arrayed in a matrix. In the memory cell array, writing and reading of data are performed per page corresponding to one row. For example, in a case where each memory cell is a single level cell (SLC), one row of memory cells stores data corresponding to one page. Alternatively, each memory cell may store multiple values, and in a case where each memory cell is a multi level cell (MLC), one row of memory cells stores data corresponding to two pages. In a case where each memory cell is triple level cell (TLC), one row of memory cells stores data corresponding to three pages.

The nonvolatile memory 21 stores, for example, management information of the memory system 20 and user data 23. The management information of the memory system 20 includes a logical/physical conversion table (L2P table) 22.

The logical/physical conversion table (L2P table) 22 is address conversion information that correlates a logical block address (LBA) used when the host system 10 accesses the memory system 20, to a physical address (a combination of block address, page address, and a location within a page) inside the nonvolatile memory 21.

The memory I/F 24 executes read/write of data and the management information from/in the nonvolatile memory 21 under the control of the main controller 28.

The buffer memory 26 includes, for example, a command queue 26a, an L2P table cache 26b, and a read buffer 26c. The command queue 26a queues commands (e.g., write command, read command, and the like) received from the host system 10. The L2P table cache 26b temporarily stores the logical/physical conversion table (L2P table) 22 when logical/physical conversion processing is performed. The read buffer 26c temporarily stores read data read through the sensing operation from the nonvolatile memory 21 in accordance with a read command. In other words, the buffer memory 26 is used as a buffer to store the data read from the nonvolatile memory 21. Additionally, the buffer memory 26 may also be used as a buffer to store data to be written in the nonvolatile memory 21. For example, the buffer memory 26 includes an SRAM, a DRAM, or the like, but it may also include a register or the like.

The host I/F 29 is an interface to establish connection to the host system 10. The host I/F 29 has a function to control data transmission between the register in the storage I/F 14 of the host system 10 and the buffer memory 26 of the memory system 20.

The main controller 28 is, for example, a central processing unit (CPU), has a function implemented by firmware, and comprehensively controls each of the constituent elements in the memory system 20 connected to the bus 30.

Figure 2:
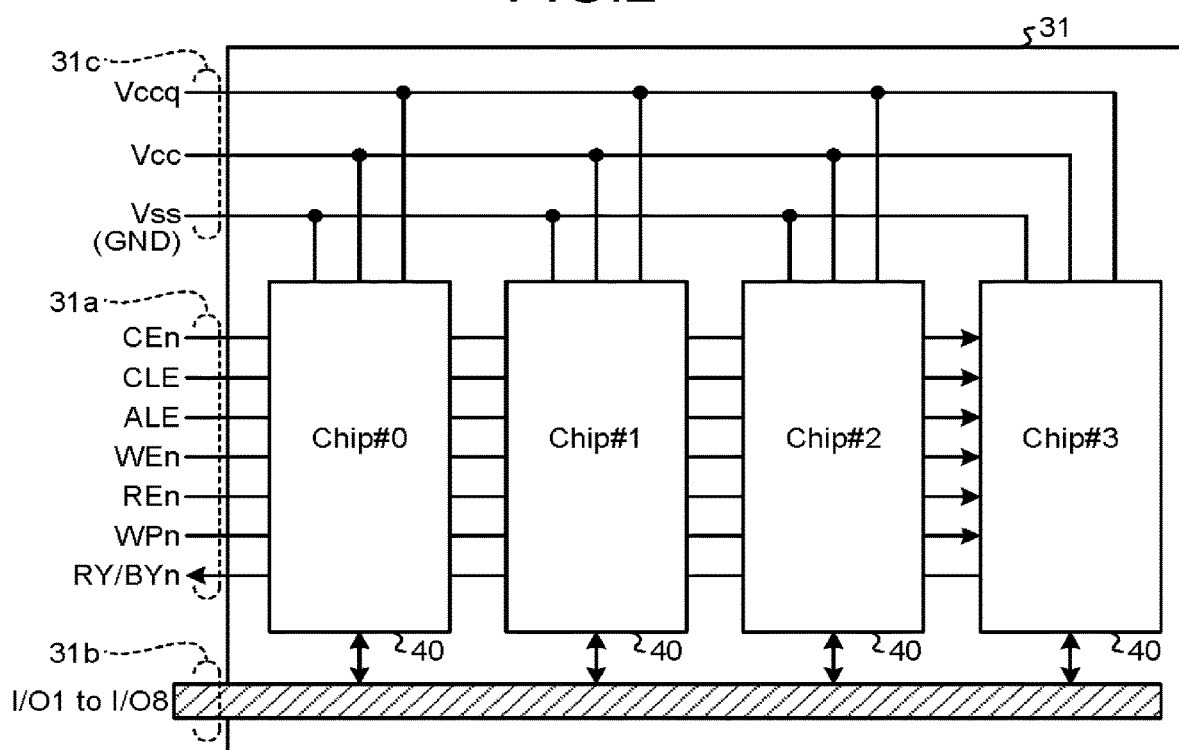
FIG. 2 is a diagram illustrating a configuration of a memory package in the embodiment.

The nonvolatile memory 21 has a plurality of memory packages 31 respectively subjected to be accessed in parallel, and each of the memory packages 31 is independently connected to the controller 2 via a signal line group. Each memory package 31 may have a configuration as illustrated in FIG. 2. FIG. 2 is a diagram illustrating the configuration of the memory package 31.

The memory package 31 includes four memory chips 40 (Chip #0 to Chip #3). Note that the number of memory chips included in the memory package 31 is not limited to four, and may be one or more. In each memory chip 40, writing and reading of data are performed in a data unit called a page. As illustrated in the drawing, a control signal line 31a to control or monitor the memory chips 40, and an input/output signal line 31b through which signals I/O1 to I/O8 such as a command, an address, and data are exchanged, and a potential supply line 31c are connected to the memory package 31.

Note that the control signal line 31a includes lines for a chip enable signal (CEn), a command latch enable signal (CLE), an address latch enable signal (ALE), a write enable signal (WEn), a read enable signal (REn), a write protect signal (WPn), a ready busy signal (RY/BYn), and the like. A character "n" appended to each signal name indicates that the signal is a negative logic (i.e., low active) signal. Additionally, the potential supply line 31c includes supply lines to supply a core circuit power supply potential Vcc, an interface circuit power supply potential Vccq, and a ground potential Vss. As illustrated in the drawing, there may be a case where the control signal line 31a and the input/output signal line 31b are provided as shared lines among a plurality of chips inside the memory package 31. Here, the input/output signal line 31b is assumed to be an 8-bit signal line as an example, but a transmission width of the input/output signal line 31b is not limited to 8 bits.

Figure 3:
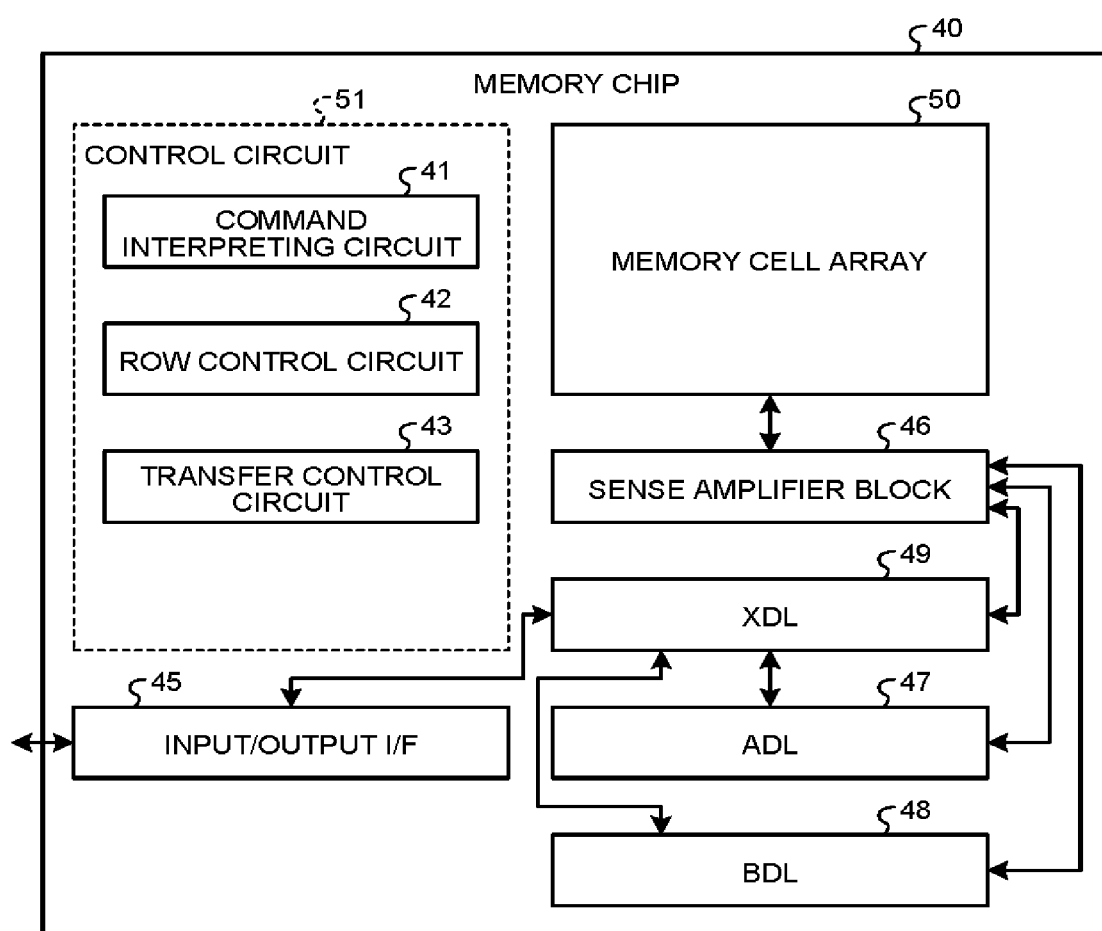
FIG. 3 is a diagram illustrating a configuration of a memory chip in the embodiment.
Figure 4:
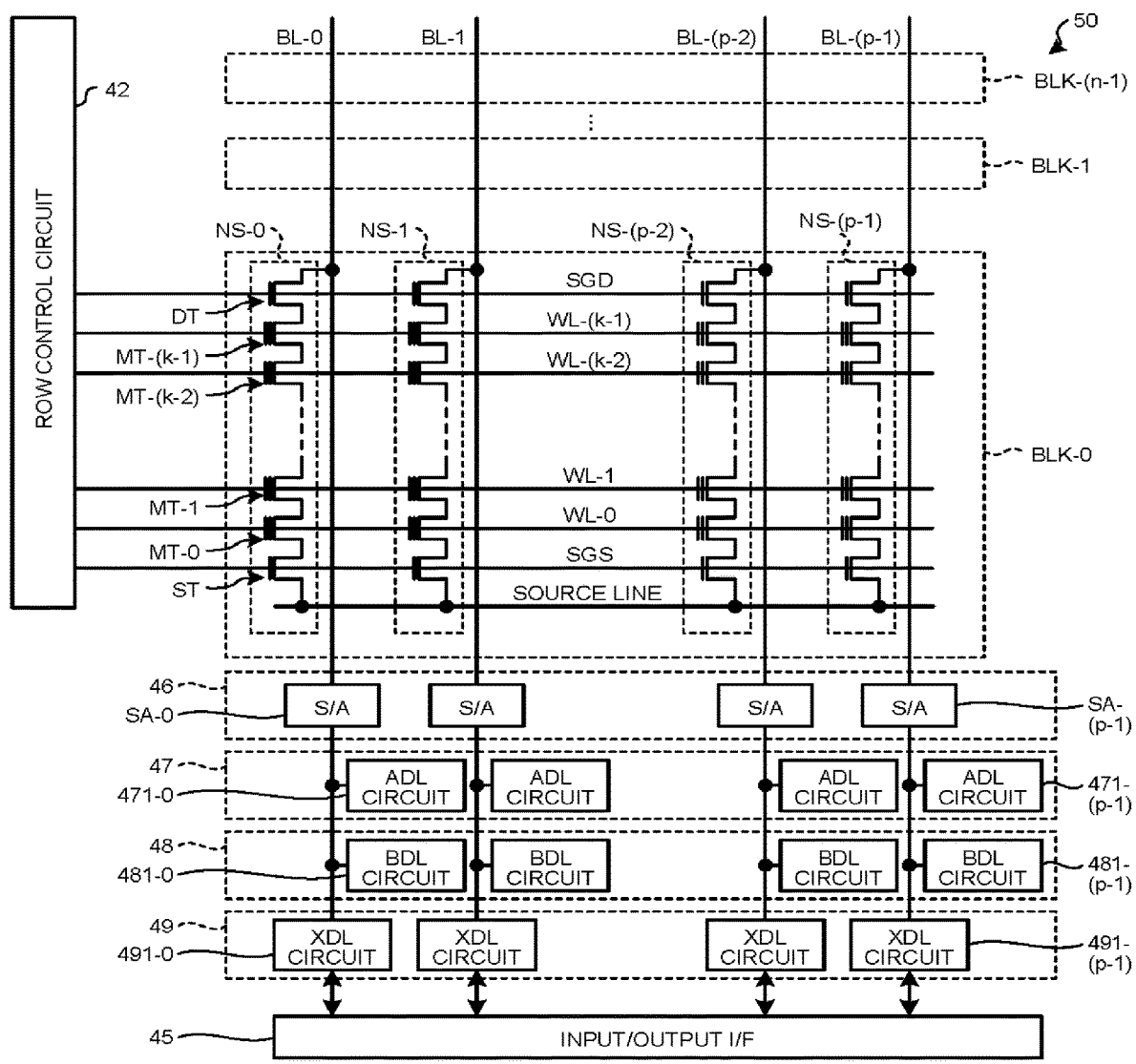
FIG. 4 is a diagram illustrating a configuration including a memory cell array and peripheral circuits in the embodiment.

Next, a configuration of each memory chip 40 will be described with reference to FIGS. 3 and 4. FIG. 3 is a block diagram illustrating the configuration of the memory chip 40. FIG. 4 is a circuit diagram illustrating a configuration including the memory cell array 50 and peripheral circuits.

The memory chip 40 includes a control circuit 51, an input/output interface (input/output I/F) 45, a sense amplifier block 46, an intermediate buffer (ADL) 47, an intermediate buffer (BDL) 48, an input/output buffer (XDL) 49, and the memory cell array 50.

The memory cell array 50 includes a plurality of memory cells. The plurality of memory cells constitutes a plurality of rows and a plurality of columns. For example, as illustrated in FIG. 4, the memory cell array 50 includes n blocks BLK-0 to BLK-(n−1) (n is a positive integer). A plurality of NAND strings NS-0 to NS-(p−1) is arranged in the respective blocks BLK-0 to BLK-(n−1). The plurality of NAND strings NS-0 to NS-(p−1) extends in a column direction, for example. The plurality of NAND strings NS-0 to NS-(p−1) is arrayed in a row direction. Each of the NAND strings NS-0 to NS-(p−1) includes, for example: a plurality of memory cells MT-0 to MT-(k−1) connected to one another in series; and two select gates ST and DT connected to both ends of each NAND string, respectively. A plurality of word lines extends in the row direction, respectively. The plurality of word lines is arrayed in the column direction. For example, as illustrated in FIG. 4, a plurality of word lines WL-0 to WL-(k−1) extends in the row direction. The plurality of word lines WL-0 to WL-(k−1) is arrayed in the column direction. In other words, the plurality of word lines WL-0 to WL-(k−1) intersects with the plurality of NAND strings NS-0 to NS-(p−1). Each of the word lines WL-0 to WL-(k−1) is connected to a control gate of each of the plurality of memory cells.

In a case where each memory cell MT is, for example, a multi level cell (MLC), multiple values can be stored by using an upper bit and a lower bit. In the case of the MLC, two pages including an upper page and a lower page are included in a plurality of memory cells connected to one word line WL (may also be simply referred to as a word line).

Alternatively, each memory cell MT may be a triple level cell (TLC) storage cell. In a case where each memory cell MT is the triple level cell (TLC) storage cell, 3-bit information can be stored in one memory cell. In the case of the TLC, three pages including an upper page, a middle page, and a lower page are included in one word line WL.

Two select gate lines SGD and SGS extend in the row direction, respectively. The select gate lines SGD and SGS are arranged respectively at both ends in the column direction of the plurality of word lines, respectively. The two select gate lines SGD and SGS are connected to control gates of the select gates DT and ST, respectively.

A plurality of bit lines extends in the column direction, respectively. The plurality of bit lines is arrayed in the row direction. For example, as illustrated in FIG. 4, a plurality of bit lines BL-0 to BL-(p−1) extends in the column direction, respectively. The plurality of bit lines BL-0 to BL-(p−1) is arrayed in the row direction. In other words, the plurality of bit lines BL-0 to BL-(p−1) corresponds to the plurality of NAND strings NS-0 to NS-(p−1).

Each NAND string NS is connected to a common source line via a corresponding select gate ST.

Additionally, each NAND string NS is connected to a corresponding bit line BL via a corresponding select gate DT.

The control circuit 51 illustrated in FIG. 3 is a state transition circuit (state machine) that performs state transition based on various kinds of the control signals (CEn, CLE, ALE, WEn, REn, and WPn illustrated in FIG. 2) received from the controller 2 and comprehensively controls operation of each of the components in the memory chip 40.

The control circuit 51 includes a command interpreting circuit 41, a row control circuit 42, and a transfer control circuit 43.

The command interpreting circuit 41 interprets a command from the controller 2 and identifies a request (i.e., a kind of access, a row address, a column address, and the like) included in the command. In a case where the request included in the command is a write request, the command interpreting circuit 41 notifies the row control circuit 42 of the write request and the row address, and notifies the column control circuit 43 of the column address. In a case where the request included in the command is a read request, the command interpreting circuit 41 notifies the row control circuit 42 of the read request and the row address, and notifies the column control circuit 43 of the column address.

The row control circuit 42 includes a row decoder 42*a* (not illustrated) and a word line driver 42*b* (not illustrated). The row decoder 42*a* is connected to the word lines WL-0 to WL-(k−1) via the word line driver 42*b*. Each of the word lines WL-0 to WL-(k−1) is connected to a control gate of each of the memory cells MT in each of the NAND strings NS. The row decoder 42*a* decodes a row address included in a command, and determines a selected word line and a non-selected word line respectively out of the plurality of word lines WL-0 to WL-(k−1). Then, the row decoder 42*a* sets a potential of the selected word line to a program potential Vpgm (about 18 V, for example) and sets a potential of the non-selected word line to a transfer potential Vpass program (about 10 V) via the word line driver 42*b* during program operation in accordance with a write request. The row decoder 42*a* sets the potential of the selected word line to a read potential VCG_R and sets the potential of the non-selected word line to a non-selected potential Vpass_read during read operation in accordance with a read request.

The sense amplifier block 46 is electrically connected between the memory cell array 50 and a data latch group (ADL 47, BDL 48, and XDL 49). The sense amplifier block 46 includes a plurality of sense amplifiers SA-0 to SA-(p−1) corresponding to the plurality of bit lines BL-0 to BL-(p−1).

Each of the ADL 47 and the BDL 48 is electrically connected between the sense amplifier block 46 and the XDL 49. In other words, each of the ADL 47 and the BDL 48 is electrically connected between the memory cell array 50 and the XDL 49. The ADL 47 includes a plurality of ADL circuits 471-0 to 471-(p−1) corresponding to the plurality of bit lines BL-0 to BL-(p−1). The BDL 48 includes a plurality of BDL circuits 481-0 to 481-(p−1) corresponding to the plurality of bit lines BL-0 to BL-(p−1).

The XDL 49 is arranged between the ADL 47 and the BDL 48 and the input/output interface (input/output I/F) 45. The input/output I/F 45 functions as an interface to establish connection to the input/output signal line 31*b* (see FIG. 2) in the memory chip 40. The XDL 49 includes a plurality of XDL circuits 491-0 to 491-(p−1) corresponding to the plurality of bit lines BL-0 to BL-(p−1).

Each ADL circuit 471 and each BDL circuit 481 are electrically connected to a line that connects each sense amplifier SA and each XDL circuit 491. The input/output I/F 45 is electrically connected between the input/output signal line 31*b* (see FIG. 2) and each XDL circuit 491. Consequently, the ADL 47 and the BDL 48 function as intermediate buffers not directly electrically connected to the input/output signal line 31*b*, and the XDI 49 functions as an input/output buffer directly electrically connected to the input/output signal line 31*b*. The expression "directly electrically connected" means that electrical connection may be established without interposing any other buffer, and the expression "not directly electrically connected" means that interposing another buffer or the like is required for electrical connection. Note that the ADL 47 and the BDL 48 may also be referred to as intermediate data latches or cache data latches, and the XDL 49 may also be referred to as an input/output data latch.

When an analysis result of the command interpreting circuit 41 is received, the transfer control circuit 43 controls data transfer between the sense amplifier block 46 and the data latch group (ADL 47, BDL 48, and XDL 49), and further controls data output from the XDL 49 to the input/output signal line 31*b* via the input/output I/F 45.

Furthermore, the command interpreting circuit 41 analyzes a command including designation of an intermediate buffer (e.g., ADL 47 or BDL 48). In a case where read commands of a plurality of threads correspond to respective settings of designation of a plurality of intermediate buffers, the command interpreting circuit 41 identifies, in accordance with each designation of an intermediate buffer, an intermediate buffer to be used for the command. In other words, the controller 25 allocates a context to a thread. For example, the controller 25 allocates a context A to a thread A, and allocates a contest B to a thread B. The controller 25 designates use of such a context for a memory chip. The command interpreting circuit 41 identifies an intermediate buffer to be used in accordance with such a context designated for use. For each context, an intermediate buffer to be used for the context is statically defined in the command interpreting circuit 41. For example, in a case where the controller 25 provides an instruction indicating the context A, the command interpreting circuit 41 interprets the text A as meaning that the controller 25 has provided the instruction to use the ADL 47. Alternatively, in a case where the controller 25 provides an instruction indicating the context B, the command interpreting circuit 41 interprets the context B as meaning that the controller 25 has provided the instruction to use the BDL 48.

Here, a thread represents a group of read commands and indicates a unit for which an expected reusability is determined (e.g., sequentiality). A thread is distinguished by: a host ID, a stream ID (which are attached to a command by the host in order to distinguish a plurality of streams from each other in a case where the host performs multi-stream processing, or are attached by a sequential determination algorithm in FIGS. 17A-17H of a second modified example described later); a kind of internal processing; and the like. Each context represents an item that is included in a thread and is to be allocated with an intermediate buffer, and as described above, each context is statically correlated to an intermediate buffer to be used. Cache hit determination is executed per context. An intermediate buffer is a physical register inside the nonvolatile memory 21.

As for a sensing command including designation of an intermediate buffer, the command interpreting circuit 41 interprets the sensing command and extracts designation of an intermediate buffer, designation of a page, a sensing operation instruction, designation of a (dummy) column address, designation of a row address, and a sensing start instruction. As for an inter-latch transfer command including designation of an intermediate buffer, the command interpreting circuit 41 interprets the inter-latch transfer command and extracts an inter-latch transfer instruction and designation of an intermediate buffer.

Note that, as for a sensing command not including designation of an intermediate buffer, the command interpreting circuit 41 interprets the sensing command and extracts designation of a page, a sensing operation instruction, designation of a (dummy) column address, designation of a row address, and a sensing start instruction. As for a data transfer command not including designation of an intermediate buffer, the command interpreting circuit 41 interprets the data transfer command and extracts an output operation instruction, designation of a column address, designation of a (dummy) row address, and an output start instruction.

Figure 5A:
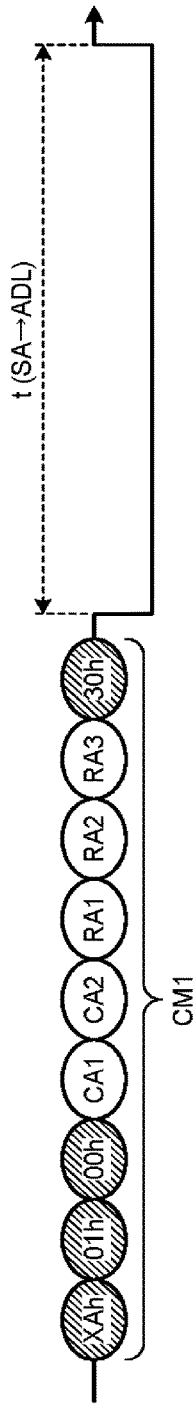
FIGS. 5A to 5D are diagrams each illustrating a command sequence in the embodiment.

For example, when a sensing command CM1 illustrated in FIG. 5A is supplied via the input/output I/F 45, the context A is designated by "XAh" in the sensing command CM1, and therefore, the command interpreting circuit 41 interprets the context A as meaning that use of the ADL 47 is explicitly designated. The command interpreting circuit 41 interprets "01h" as meaning that a lower page is designated, and interprets "00h" as a sensing operation instruction. Then, the command interpreting circuit 41 ignores "CA1" and "CA2" as dummy column addresses, interprets "RA1", "RA2", and "RA3" as row addresses, and interprets "30h" as a sensing start instruction.

In accordance with this, the row control circuit 42 sets a potential of a selected word line to the read potential VCG_R and sets a potential of a non-selected word line to the non-selected potential Vpass_read during a period indicated by t (SA→ADL) during which a ready busy signal RY/BYn is busy (low level). The sense amplifier block 46 performs sensing operation for the lower page of a memory cell group designated by the row address in the memory cell array 50. The transfer control circuit 43 transfers, to the ADL 47, data for one page detected by the sensing operation of the sense amplifier block 46 and stores the transferred data in the ADL 47.

Figure 5B:
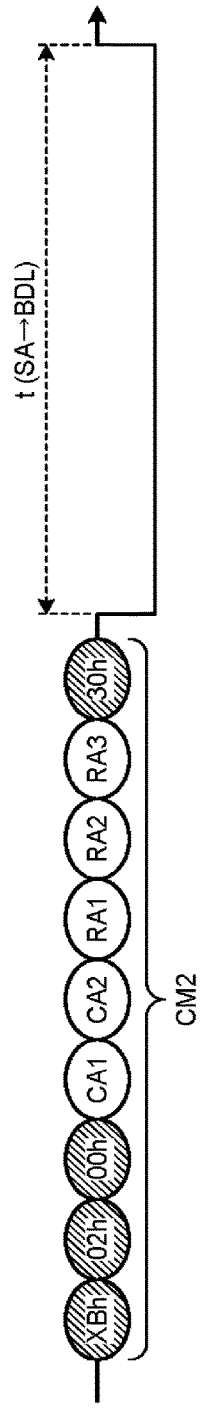

For example, when a sensing command CM2 illustrated in FIG. 5B is supplied via the input/output I/F 45, the context B is designated by "XBh" in the sensing command CM2, and therefore, the command interpreting circuit 41 interprets the context B as meaning that use of the BDL 48 is explicitly designated. The command interpreting circuit 41 interprets "02h" as meaning that a middle page is designated, and interprets "00h" as a sensing operation instruction. Then, the command interpreting circuit 41 ignores "CA1" and "CA2" as dummy column addresses, interprets "RA1", "RA2", and "RA3" as row addresses, and interprets "30h" as a sensing start instruction.

In accordance with this, the row control circuit 42 sets a potential of a selected word line to the read potential VCG_R, and sets a potential of a non-selected word line to the non-selected potential Vpass_read during a period indicated by t (SA→BDL) during which the ready busy signal RY/BYn is busy (low level). The sense amplifier block 46 performs sensing operation for the middle page of a memory cell group designated by the row address in the memory cell array 50. The transfer control circuit 43 transfers, to the BDL 48, data for one page detected by the sensing operation of the sense amplifier block 46 and stores the transferred data in the BDL 48.

Figure 5C:
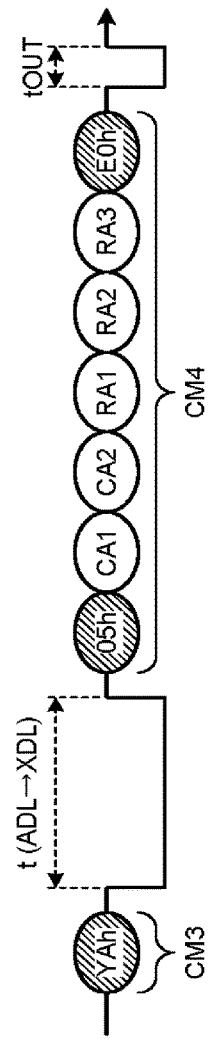

For example, when an inter-latch transfer command CM3 illustrated in FIG. 5C is supplied via the input/output I/F 45, the command interpreting circuit 41 interprets, in the inter-latch transfer command, "YAh" as an inter-latch transfer instruction and further interprets "YAh" as explicit designation of the ADL 47, thereby allocating the XDL 49 to the context A.

In accordance with this, the transfer control circuit 43 transfers data for one page stored in the ADL 47 to the XDL 49 during a period indicated by t (from ADL to XDL) during which the ready busy signal RY/BYn is busy (low level).

Subsequently, the command interpreting circuit 41 interprets "05h" as a transfer instruction in a data transfer command CM4 illustrated in FIG. 5C. Then, the command interpreting circuit 41 interprets "CA1" and "CA2" as column addresses in the XDL 49, ignores "RA1", "RA2", and "RA3" as dummy row addresses, and interprets "E0h" as an output start instruction.

In accordance with this, the transfer control circuit 43 transfers data designated by the column address in the XDL 49 to the input/output signal line 31*b* via the input/output I/F 45 during a period indicated by tOUT during which the ready busy signal RY/BYn is busy (low level).

Figure 5D:
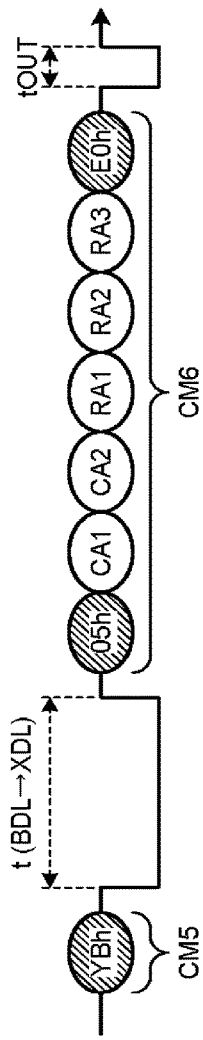

For example, when an inter-latch transfer command CM5 illustrated in FIG. 5D is supplied via the input/output I/F 45, the command interpreting circuit 41 interprets "YBh" as an inter-latch transfer instruction in the inter-latch transfer command CM5 and further interprets "YBh" as explicit designation of the BDL 48, thereby allocating the XDL 49 to the context B.

In accordance with this, the transfer control circuit 43 transfers data for one page stored in the BDL 48 to the XDL 49 during a period indicated by t (from BDL to XDL) during which the ready busy signal RY/BYn is busy (low level).

Subsequently, the command interpreting circuit 41 interprets "05h" as a transfer instruction in the data transfer command CM6 illustrated in FIG. 5D. Then, the command interpreting circuit 41 interprets "CA1" and "CA2" as column addresses in the XDL 49, ignores "RA1", "RA2", and "RA3" as dummy row addresses, and interprets "E0h" as an output start instruction.

In accordance with this, the row control circuit 42 transfers data designated by the column address in the XDL 49 to the input/output signal line 31b via the input/output I/F 45 during a period indicated by tour during which the ready busy signal RY/BYn is busy (low level).

On the other hand, in the controller 25 of the memory system 20, a case of executing the read processing for a plurality of threads may be considered as a situation to issue a command including designation of an intermediate buffer (ADL 47 or BDL 48). In a case where there is a plurality of sets of read processing to be executed in parallel, the controller 25 allocates threads to the plurality of sets of read processing, and performs access control to the nonvolatile memory 21 by issuing a command while managing each of the threads.

Figure 6:
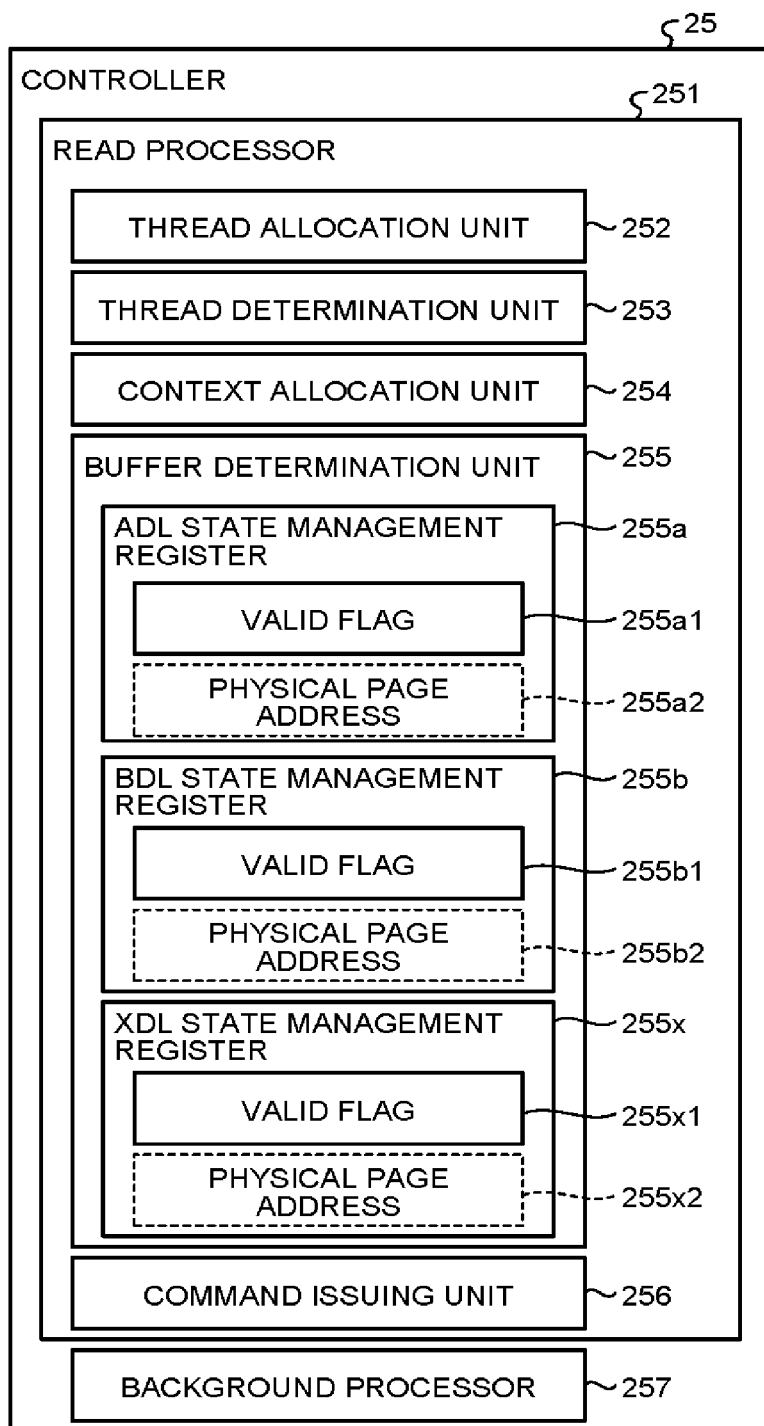
FIG. 6 is a diagram illustrating functional components of a controller in the embodiment.

Specifically, the controller 25 includes a read processor 251 and a background processor 257 as functional components. The read processor 251 includes a thread allocation unit 252, a thread determination unit 253, a context allocation unit 254, a buffer determination unit 255, and a command issuing unit 255. Note that the controller 25 may be implemented as a controller package including a system-on-a-chip (SoC), for example, as described above. The functional components illustrated in FIG. 6 may be implemented with hardware (e.g., as a circuit) or the like in the controller package. Alternatively, each of the functions illustrated in FIG. 6 may be implemented with software or the like in the controller package (for example, by the main controller 28 executing firmware in the buffer memory 26 or the like, entirely or partly loaded in accordance with progress of the processing). Alternatively, as for the respective functions illustrated in FIG. 6, some of the functions may be implemented with hardware, and rest of the functions may be implemented with software or the like in the controller package.

The background processor 257 controls background processing spontaneously executed by the memory system 20 not on the basis of a host command, and issues a background read process request to the read processor 251 in accordance with the background processing. The background read process request includes, for example, a compaction read process request, a patrol read process request, and the like. The compaction read process request is used in processing to collect data of valid clusters in the memory cell array 50 in compaction processing. In the compaction processing, the data collected by compaction read from a block having the small number of valid clusters in the memory cell array 50 is moved to another block.

Consequently, it is possible to improve use efficiency of the blocks in the memory cell array 50 can be improved. The patrol read process request is used in patrol processing to determine whether refresh processing is necessary or not. In the patrol processing, a degree of bit errors accumulated in each memory cell is evaluated (e.g., the patrol read is performed to attempt error correction), thereby selecting a refresh target block. In the refresh processing, data included in the selected refresh target block is read and is subjected to error correction, and then the corrected data is written back to another block (or to the same refresh target block). Consequently, reliability of the data stored in the memory cell array 50 can be improved.

In a case where there is a plurality of sets of read processing to be executed in parallel in accordance with read commands received from the host system 10 or background read process requests received from the background processor 257, the thread allocation unit 252 classifies the plurality of sets of read processing into threads.

The thread determination unit 253 determines, for each thread, reusability of page data stored in an intermediate buffer (determines sequentiality of a read command, for example).

For example, the thread determination unit 253 determines, for each thread, sequentiality of the read command of the thread on the basis of consecutiveness of logical addresses of a plurality of read commands. Specifically, the thread determination unit 253 performs, for each thread, comparison between the logical addresses of the plurality of read commands received from the host in parallel. In a case where the logical addresses of the plurality of read commands are consecutive or substantially consecutive, it is possible to estimate that there may be sequential accesses in the future. In a case where the consecutiveness of the logical addresses of the plurality of read commands is higher than a predetermined consecutiveness, the thread determination unit 253 determines that the sequentiality of the read commands is high. It should be noted that the predetermined consecutiveness may be determined in advance according to values obtained in experiments. As a result, the thread determination unit 253 determines, for the thread, that reusability of page data is high. In a case where the consecutiveness of the logical addresses of the plurality of read commands is low (i.e., non-consecutiveness is high), the thread determination unit 253 determines that the sequentiality of the read commands is low. As a result, the thread determination unit 253 determines, for the thread, that reusability of page data is low.

The context allocation unit 254 allocates a context to each thread for which the thread determination unit 253 has determined that reusability of page data stored in an intermediate buffer is higher (for example, read command sequentiality is high) than a predetermined reusability. It should be noted that the predetermined reusability may be determined in advance according to values obtained in experiments. In a case where the number of threads is larger than the number of contexts, the context allocation unit 254 may preferentially allocate a context to a thread that requires a larger amount of data per unit time. For example, the context allocation unit 254 allocates a context A to a thread A and a context B to a thread B. Each context corresponds to a certain intermediate buffer. For example, the thread A corresponds to the intermediate buffer (ADL 47), and the thread B corresponds to the intermediate buffer (BDL 48).

Specifically, the buffer determination unit 255 includes an ADL state management register 255a, a BDL state management register 255b, and an XDL state management register 255c. The buffer determination unit 255 tracks: a state of the intermediate buffer (ADL 47 or BDL 48) corresponding to a context to which a thread is allocated; and a state of the input/output buffer (XDL 49), and performs page cache hit determination. The page cache determination includes: determination on whether data latch holds a valid data; and determination on whether data same as data of a page requested by a read command is cached.

The ADL state management register 255a includes a valid flag 255a1. The valid flag 255a1 stores a bit value (e.g., "1") indicating valid state or a bit value (e.g., "0") indicating invalid state, and indicates whether page data stored in the ADL 47 is valid data or invalid data (data to be treated as a cache miss). In a case where the valid flag 255a1 stores the bit value indicating valid state, the ADL state management register 255a further includes a physical page address 255a2. The physical page address 255a2 is a physical page address corresponding to the page data stored in the ADL 47. In a case where the valid flag 255a1 stores the bit value indicating invalid state, the ADL state management register 255a may not necessarily include the physical page address 255a2. Note that the ADL state management register 255a may not necessarily independently include the valid flag of the physical page address. Instead, the ADL state management register 255a may indicate that the page data stored in the ADL 47 is invalid data by storing a predetermined special value in the physical page address.

The BDL state management register 255b is basically similar to the ADL state management register 255a, and may include a valid flag 255b1 indicating whether page data stored in the BDL 48 is valid, and may include a BDL. 48 physical page address 255b2. The physical page address 255b2 is a physical page address corresponding to the page data stored in the BDL 48.

The XDL state management register 255x is basically similar to the ADL state management register 255a, and may include a valid flag 255x1 indicating whether page data stored in the XDL 49 is valid, and may include a physical page address 255x2. The physical page address 255x2 is a physical page address corresponding to the page data stored in the XDL 49.

When a read command is received from the host, the buffer determination unit 255 obtains a physical address obtained by logical-physical conversion for a logical address (LBA) included in the read command. The buffer determination unit 255 extracts a physical page address from the physical address and compares the extracted physical page address with a physical page address included in a state management register. In a case where the extracted physical page address is the same as the physical page address included in the state management register and page data of the buffer is valid data, the buffer determination unit 255 determines the state as the cache hit. In a case of fulfilling at least one of the conditions that the extracted physical page address is different from the physical page address included in the state management register and the page data of the buffer is invalid, the buffer determination unit 255 determines the state as a cache miss. The buffer determination unit 255 determines, on the basis of the determination result of the cache hit/miss, necessity of a command (sensing command and/or inter-latch transfer command) including designation of an intermediate buffer. Specifically, in a case of determining the state as the cache hit in the input/output buffer (XDL 49), the buffer determination unit 255 determines that neither the sensing command nor the inter-latch transfer command is necessary. In a case of determining the state as the cache miss in the input/output buffer (XDL 49) and further determining the state as the cache hit in any one of the intermediate buffers (ADL 47 or BDL 48), the buffer determination unit 255 determines that the sensing command is not necessary and the inter-latch transfer command is necessary. In a case of determining the state as the cache miss in both the input/output buffer and the intermediate buffer, the buffer determination unit 255 determines that the sensing command is necessary.

The command issuing unit 255 issues, on the basis of the cache hit determination result, a command (sensing command and/or inter-latch transfer command) determined by the buffer determination unit 255 as a necessary command including designation of an intermediate buffer, and supplies the issued command to the nonvolatile memory 21.

Figure 7:
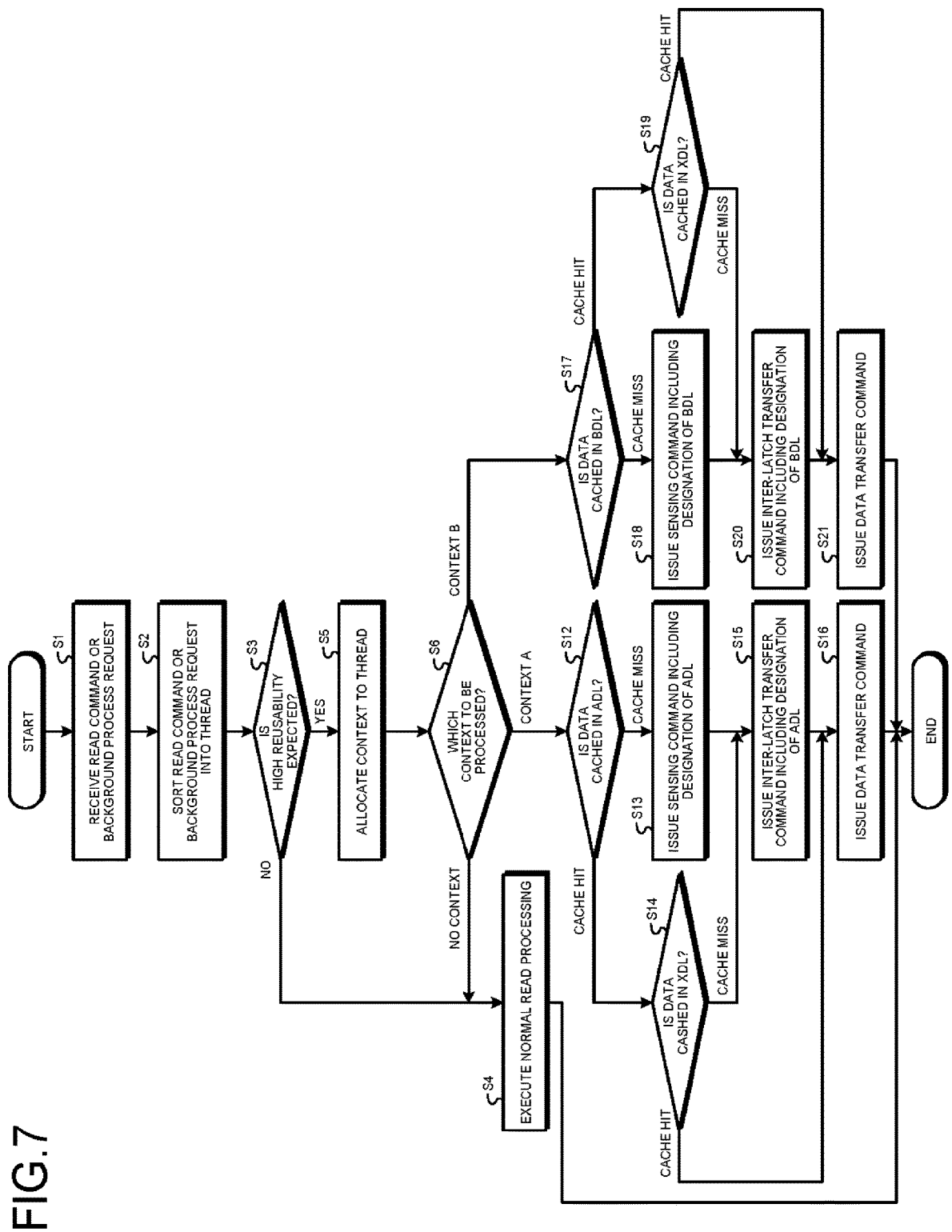
FIG. 7 is a flowchart illustrating operation of the controller in the embodiment.

Additionally, the controller 25 performs operation as illustrated in FIG. 7. FIG. 7 is a flowchart illustrating the operation of the controller 25.

When a read command or a background read process request is received (S1), the controller 25 determines whether there is a plurality of sets of read processing to be executed in parallel in accordance with the read command or the background read process request.

In a case where there is the plurality of sets of read processing to be executed in parallel, the controller 25 sorts each of the plurality of sets of read processing into a thread (S2). For example, for a plurality of read commands received from the host in parallel or a plurality of background process requests, the controller 25 determines, on the basis of a host ID, a stream ID, or a kind of background processing (e.g., compaction, patrol read, or the like) and the like, whether there is any thread to be handled separately. The controller 25 determines, for each thread, whether reusability of data stored in an intermediate buffer is high than the predetermined reusability (S3). For example, the controller 25 performs, for each thread, comparison between logical addresses of the plurality of read commands received from the host in parallel. In a case where the logical addresses of the plurality of read commands are consecutive or substantially consecutive, it is possible to estimate that there may be sequential accesses in the future. In the case where consecutiveness of the logical addresses of the plurality of read commands is higher than the predetermined consecutiveness, the controller 25 determines that sequentiality of the plurality of read commands is higher than a predetermined threshold. As a result, the controller 25 determines, for the thread, that reusability of data stored in the intermediate buffer is high (Yes in S3). In the case where consecutiveness of the logical addresses of the plurality of read commands is low, the controller 25 determines that sequentiality of the plurality of read commands is low (i.e., non-consecutiveness is higher than a predetermined non-consecutiveness). As a result, the controller 25 determines, for the thread, that reusability of the data stored in the intermediate buffer is low (No in S3). Note that the grounds to determine the reusability is not limited to the consecutiveness of the logical addresses included in the read commands. For example, a read request in the background processing includes a physical address and does not necessarily include a logical address, but it can be expected that target physical addresses are consecutive in accordance with the kind of processing such as the compaction processing or the patrol read processing. Therefore, it may be determined for the thread that reusability of data stored in the intermediate buffer is higher than the predetermined reusability, on the grounds that the thread corresponds to the specific kind of background processing.

In a case where the reusability of the data stored in the intermediate buffer is low (e.g., sequentiality of the thread is low) (No in S3), the controller 25 executes normal read processing (S4). In the normal read processing, the controller 25 sequentially issues conventional sensing commands (in other words, sensing commands not explicitly designating a storage destination of a sense result) and data transfer commands, supplies these commands to the nonvolatile memory 21, and receives read data from the nonvolatile memory 21. The controller 25 transmits the received read data to the host system 10. Note that, even in the normal read processing (S4), the state of the XDL 49 may be tracked to make determination on page data cache, and in a case of determining the state is the cache hit, the sensing operation may be omitted and the processing to reuse the data of the XDL 49 may be executed.

In a case where reusability of the data stored in the intermediate buffer is higher than the predetermined reusability (e.g., sequentiality of threads is higher than the predetermined threshold) (Yes in S3), the controller 25 allocates a context to the thread (S5). In a case of "the number of threads≥the number of contexts=the number of intermediate buffers", the contexts are allocated to the number of threads, out of the plurality of threads, determined to have high reusability (such as high sequentiality) and correspond to the number of contexts. At this time, the controller 25 may preferentially allocate a context to a thread, out of the plurality of threads, having a larger amount of accesses per unit time. For example, the controller 25 allocates a context A to a thread A, allocates a context B to a thread B, and does not allocate any context to other threads.

In a case where a context to be processed is the context A ("context A" in S6), the controller 25 determines whether target data is cached in the ADL 47 of the nonvolatile memory 21 (S12). The controller 25 refers to the valid flag 255*a*1 stored in the ADL state management register 255*a*, and determines whether the data stored in the ADL 47 is valid. In a case where the data is valid, the controller 25 determines whether a physical page address stored in the ADL state management register 255*a* is identical to a physical page address of a read process request to be processed. In a case where the data stored in the ADL 47 is invalid or the physical page address stored in the ADL state management register 255*a* is not identical to the physical page address of the read process request to be processed, the controller 25 determines that the target data is not cached in the ADL 47. In the case where the target data is not cached in the ADL 47 ("cache miss" in S12), the controller 25 issues a sensing command including designation of the ADL 47 (see the sensing command CM1 illustrated in FIG. 5A), and supplies the sensing command to the nonvolatile memory 21 (S13). Consequently, in the nonvolatile memory 21, data read through the sensing operation from a memory cell addressed by the sensing command is stored in the ADL 47.

Additionally, the controller 25 updates the ADL state management register 255*a*. Specifically, the controller 25 sets a bit value indicating valid state to the valid flag 255*a*1, and stores the physical page address of the read process request as the physical page address 255*a*2.

When the data stored in the ADL 47 is valid and the physical page address stored in the ADL state management register 255*a* is identical to the physical page address of the read process request to be processed, the controller 25 determines that the target data is cached in the ADL 47. In the case where the target data is cached in the ADL 47 ("cache hit" in S12), the controller 25 further determines whether the target data is cached in the XDL 49 of the nonvolatile memory 21 (S14).

The controller 25 refers to a valid flag 255*x*1 stored in the XDL state management register 255*x* and determines whether the data stored in the XDL 49 is valid. In a case where the data is valid, the controller 25 determines whether the physical page address stored in the XDL state management register 255*x* is identical to the physical page address of the read process request to be processed. In a case where the data stored in the XDL 49 is invalid or the physical page address stored in the XDL state management register 255*x* is not identical to the physical page address of the read process request to be processed, the controller 25 determines that the target data is not cached in the XDL 49 ("cache miss" in S14), and the processing proceeds to S15. In the case where the target data is not cached in the XDL 49 ("cache miss" in S12), or after completion of S13, the controller 25 issues an inter-latch transfer command including designation of the ADL 47 (see the inter-latch transfer command CM3 illustrated in FIG. 5C) and supplies the inter-latch transfer command to the nonvolatile memory 21 (S15). Consequently, the data stored in the ADL 47 is transferred to and stored in the XDL 49 of the nonvolatile memory 21. Additionally, the controller 25 updates the XDL state management register. Specifically, the controller 25 sets a bit value indicating valid state in the valid flag 255*x*1, and stores a physical page address same as the physical page address 255*a*2 as the physical page address 255*x*2.

When the data stored in the XDL 49 is valid and the physical page address stored in the XDL state management register 255*x* is identical to the physical page address of the read process request to be processed, the controller 25 determines that the target data is cached in the XDL 49. In the case where the target data is cached in the XDL 49 ("cache hit" in S14) or after completion of S15, the controller 25 issues a data transfer command (see the data transfer command CM4 illustrated in FIG. 5C) and supplies the data transfer command to the nonvolatile memory 21 (S16). Consequently, in the nonvolatile memory 21, data addressed by the data transfer command among the data stored in the XDL 49 is output to the controller 25 via the input/output signal line 31*b*. The controller 25 transmits the received read data to the host system 10.

On the other hand, when a context to be processed is the context B ("context B" in S6), the controller 25 determines whether target data is cached in the BDL 48 of the nonvolatile memory 21 (S17). The controller 25 refers to a valid flag 255*b*1 stored in the BDL state management register 255*b* and determines whether the data stored in the BDL 48 is valid. In the case where the data is valid, the controller 25 determines whether a physical page address stored in the BDL state management register 255*b* is identical to the physical page address of the read process request to be processed. In a case where the data stored in the BDL 48 is invalid or the physical page address stored in the BDL state management register 255*b* is not identical to the physical page address of the read process request to be processed, the controller 25 determines that the target data is not cached in the BDL 48. In the case where the target data is not cached in the BDL 48 ("cache miss" in S17), the controller 25 issues a sensing command including designation of the BDL 48 (see the sensing command CM2 illustrated in FIG. 5B) and supplies the sensing command to the nonvolatile memory 21 (S18). Consequently, the data read through the sensing operation from a memory cell addressed by the sensing command is stored in the BDL 48 of the nonvolatile memory 21. Additionally, the controller 25 updates the BDL state management register. Specifically, the controller 25 sets a bit value indicating valid state to the valid flag 255*b*1, and stores the physical page address of the read process request as a physical page address 255*b*2.

When the data stored in the BDL 48 is valid and the physical page address stored in the BDL state management register 255*b* is identical to the physical page address of the read process request to be processed, the controller 25 determines that the target data is cached in the BDL 48. In the case where the target data is cached in the BDL 48 ("cache hit" in S17), the controller 25 further determines whether the target data is cached in the XDL 49 of the nonvolatile memory 21 (S19).

The controller 25 refers to the valid flag 255x1 stored in the XDL state management register 255x and determines whether the data stored in the XDL 49 is valid. In the case where the data is valid, the controller 25 determines whether the physical page address 255x2 stored in the XDL state management register 255x is identical to the physical page address of the read process request to be processed. In a case where the data stored in the XDL 49 is invalid or the physical page address 255x2 stored in the XDL state management register 255x is not identical to the physical page address of the read process request to be processed, the controller 25 determines that the target data is not cached in the XDL 49. In a case where the target data is not cached in the XDL 49 ("cache miss" in S19), or after completion of S18, the controller 25 issues an inter-latch transfer command including designation of the BDL 48 (see the inter-latch transfer command CM5 illustrated in FIG. 5D) and supplies the inter-latch transfer command to the nonvolatile memory 21 (S20). Consequently, the data stored in the BDL 48 is transferred to and stored in the XDL 49 of the nonvolatile memory 21. Additionally, the controller 25 updates the XDL state management register. Specifically, the controller 25 sets a bit value indicating valid state in the valid flag 255x1, and stores a physical page address same as the physical page address 255a2 as the physical page address 255x2.

When the data stored in the XDL 49 is valid and the physical page address stored in the XDL state management register 255x is identical to the physical page address of the read process request to be processed, the controller 25 determines that the target data is cached in the XDI 49. In the case where the target data is cached in the XDI 49 ("cache hit" in S19) or after completion of S20, the controller 25 issues a data transfer command (see the data transfer command CM6 illustrated in FIG. 5D) and supplies the data transfer command to the nonvolatile memory 21 (S21). Consequently, data addressed by the data transfer command among the data stored in the XDL 49 is output to the controller 25 via the input/output signal line 31b in the nonvolatile memory 21. The controller 25 transmits the received read data to the host system 10. It should be noted that, after S5, in a case where a context to be processed does not exist ("no context" in S6), the controller 25 executes normal read processing (S4).

Figure 8:
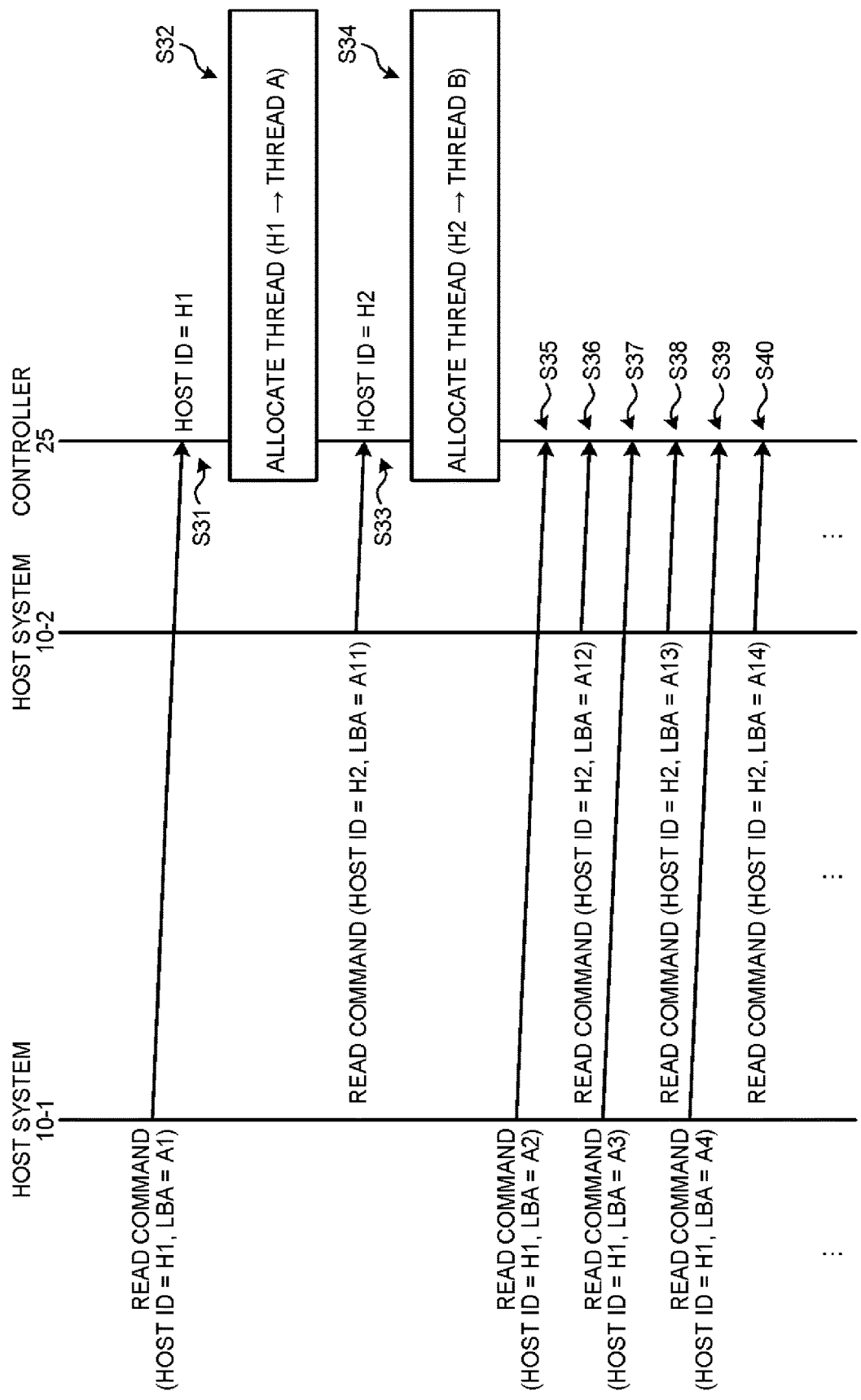
FIG. 8 is a sequence diagram illustrating exemplary operation of the information processing system relating to a plurality of threads in the embodiment.

As a case where there is a plurality of sets of read processing to be executed in parallel as described in S3, a case illustrated in FIG. 8 can be considered, for example. FIG. 8 is a sequence diagram illustrating exemplary operation of the information processing system 1 relating to a plurality of threads. FIG. 8 exemplifies the case where the controller 25 receives read commands from a plurality of host systems 10-1 and 10-2 in parallel (for example, alternately).

For example, when a read command (host ID=H1, LBA=A1) is received from the host system 10-1 (S31), the controller 25 extracts the host ID=H1 included in the read command. The controller 25 allocates a thread A to the extracted host ID=H1 (S32).

Subsequently, when a read command (host ID=H2, LBA=A11) is received from the host system 10-2 (S33), the controller 25 extracts the host ID=H2 included in the read command. The controller 25 allocates a thread B to the extracted host ID=H2 (S34).

In accordance with this, when a read command (host ID=H1, LBA=A2) is received from the host system 10-1 (S35), the controller 25 processes the read command as a read command of the thread A.

When a read command (host ID=H2, LBA=A12) is received from the host system 10-2 (S36), the controller 25 processes the read command as a read command of the thread B.

When a read command (host ID=H1, LBA=A3) is received from the host system 10-1 (S37), the controller 25 processes the read command as a read command of the thread A.

When a read command (host ID=H2, LBA=A13) is received from the host system 10-2 (S38), the controller 25 processes the read command as a read command of the thread B.

When a read command (host ID=H1, LBA=A4) is received from the host system 10-1 (S39), the controller 25 processes the read command as a read command of the thread A.

When a read command (host ID=H2, LBA=A14) is received from the host system 10-2 (S40), the controller 25 processes the read command as a read command of the thread B.

Figure 9:
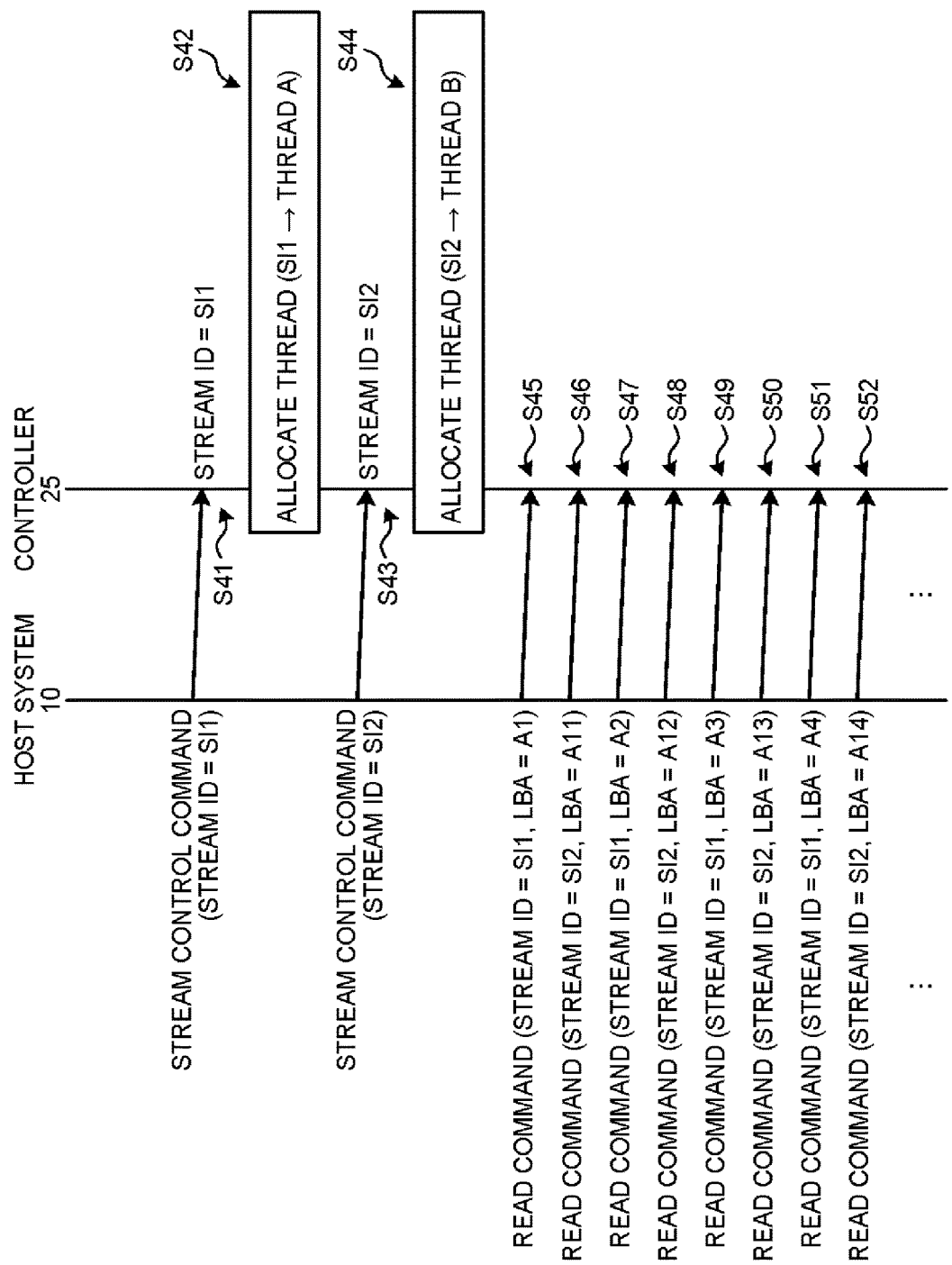
FIG. 9 is a sequence diagram illustrating another exemplary operation of the information processing system relating to a plurality of threads in the embodiment.

Alternatively, as a case where there is a plurality of sets of read processing to be executed in parallel, a case illustrated in FIG. 9 can be considered, for example. FIG. 9 is a sequence diagram illustrating another exemplary operation of the information processing system 1 relating to a plurality of threads. FIG. 9 exemplifies the case where the controller 25 successively receives read commands by multi-stream processing from the host system 10

For example, when a stream control request (stream ID=SI1) is received from the host system 10 (S41), the controller 25 allocates a thread A to the stream ID=SI1 (S42).

Subsequently, when a stream control request (stream ID=SI2) is received from the host system 10 (S43), the controller 25 allocates a thread B to the stream ID=SI2 (S44).

In accordance with this, when a read command (stream ID=SI1, LBA=A1) is received from the host system 10 (S45), the controller 25 processes the read command as a read command of the thread A.

When a read command (stream ID=SI2, LBA=A11) is received from the host system 10 (S46), the controller 25 processes the read command as a read command of the thread B.

When a read command (stream ID=SI1, LBA=A2) is received from the host system 10 (S47), the controller 25 processes the read command as a read command of the thread A.

When a read command (stream ID=SI2, LBA=A12) is received from the host system 10 (S48), the controller 25 processes the read command as a read command of the thread B.

When a read command (stream ID=SI1, LBA=A3) is received from the host system 10 (S49), the controller 25 processes the read command as a read command of the thread A.

When a read command (stream ID=SI2, LBA=A13) is received from the host system 10 (S50), the controller 25 processes the read command as a read command of the thread B.

When a read command (stream ID=SI1, LBA=A4) is received from the host system 10 (S51), the controller 25 processes the read command as a read command of the thread A.

When a read command (stream ID=SI2, LBA=A14) is received from the host system 10 (S52), the controller 25 processes the read command as a read command of the thread B.

Figure 10:
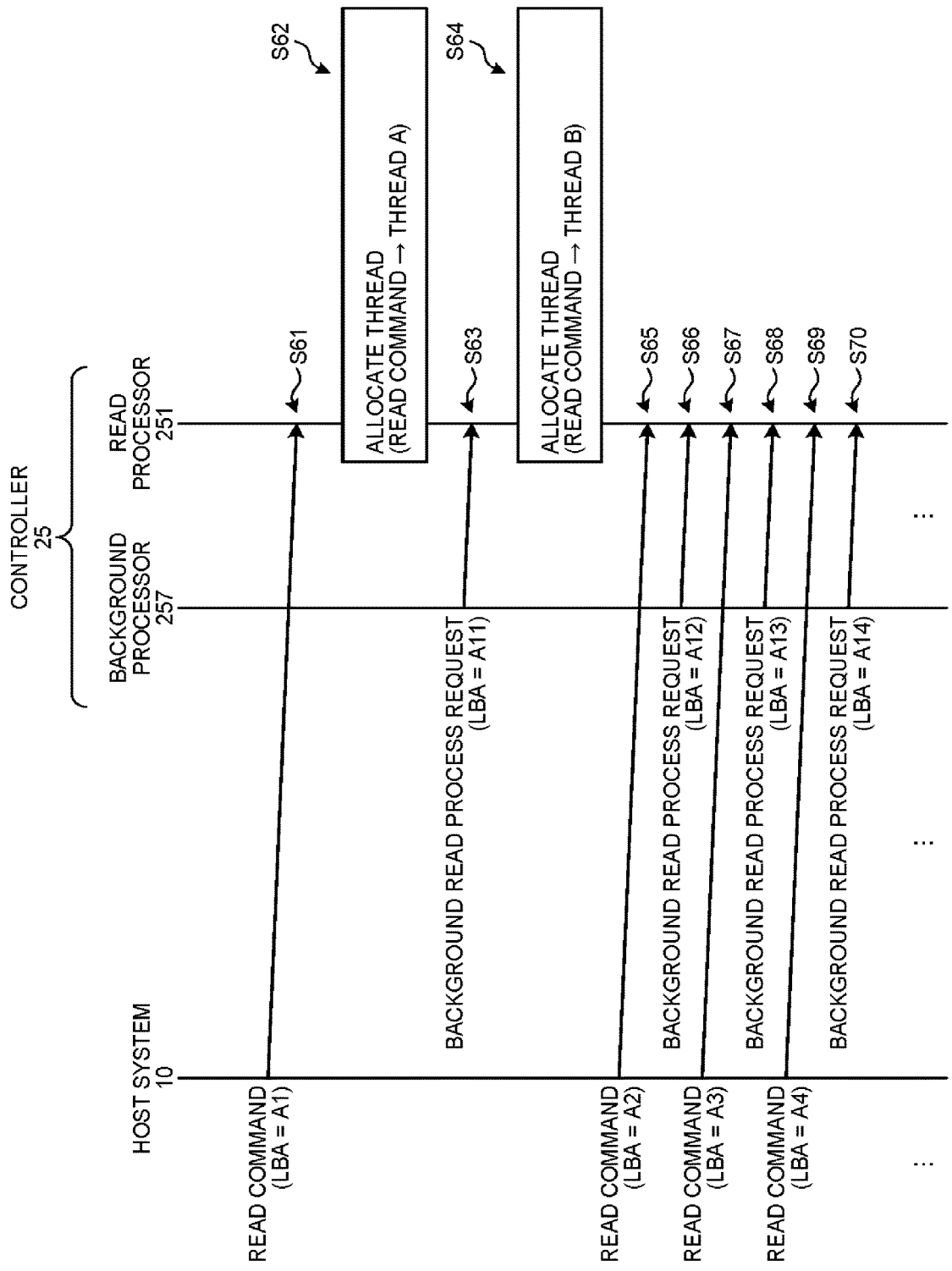
FIG. 10 is a sequence diagram illustrating still another exemplary operation of the information processing system relating to a plurality of threads in the embodiment.

Alternatively, as a case where there is a plurality of sets of read processing to be executed in parallel, a case illustrated in FIG. 10 can be considered, for example. FIG. 10 is a sequence diagram illustrating still another exemplary operation of the information processing system 1 relating to a plurality of threads. FIG. 10 exemplifies the case where the read processor 251 receives a read command from the host system 10 and further receives a background read process request from the background processor 257.

For example, when a read command (LBA=A1) is received from the host system 10 (S61), the read processor 251 allocates a thread A to the read command (S62).

Subsequently, when a background read process request (LBA=A11) is received from the background processor 257 (S63), the read processor 251 allocates a thread B to the background read process request (S64).

In accordance with this, when a read command (LBA=A2) is received from the host system 10 (S65), the read processor 251 processes the read command as a read command of the thread A.

When a background read process request (LBA=A12) is received from the background processor 257 (S66), the read processor 251 processes the background read process request as a background read process request of the thread B.

When a read command (LBA=A3) is received from the host system 10-1 (S67), the read processor 251 processes the read command as a read command of the thread A.

When a background read process request (LBA=A13) from the background processor 257 (S68), the read processor 251 processes the background read process request as a background read process request of the thread B.

When a read command (LBA=A4) is received from the host system 10-1 (S69), the read processor 251 processes the read command as a read command of the thread A.

When a background read process request (LBA=A14) is received from the background processor 257 (S70), the read processor 251 processes the background read process request as the background read process request of the thread B.

Figure 11:
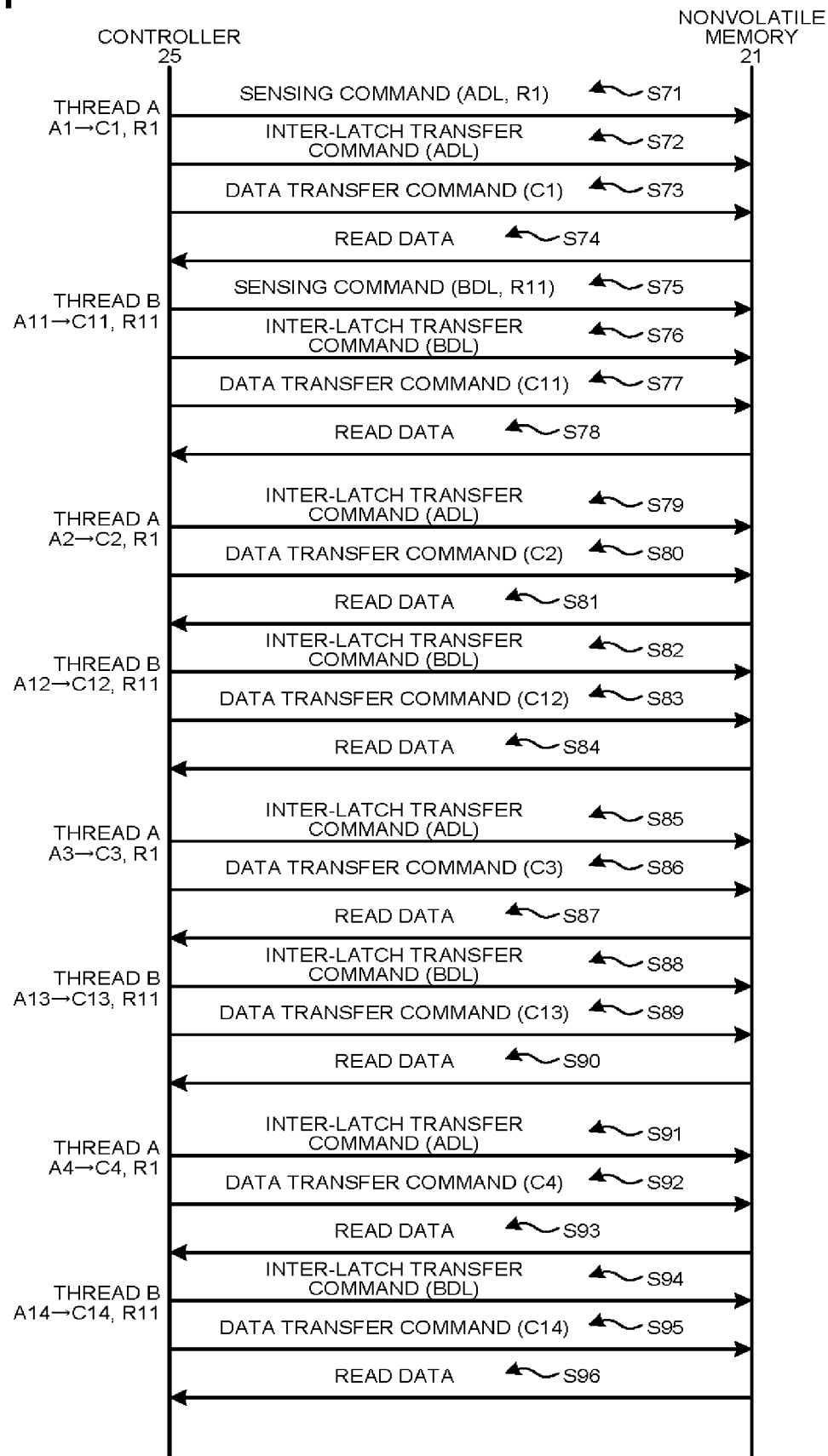
FIG. 11 is a sequence diagram illustrating operation of the memory system in the embodiment.

As exemplary operation of S10, in a case of alternately receiving a read command of the thread A and a read command of the thread B in parallel, operation as illustrated in FIG. 11 is performed in the memory system 20. FIG. 11 is a sequence diagram illustrating the operation of the memory system 20. FIG. 11 exemplifies a case where both a data size requested by each read command and a data size instructed by each data transfer command are ¼ (16 KB×¼=4 KB) of a page size in order to simplify the illustration and the description.

For example, the controller 25 converts a logical address A1 into a physical address (column address C1 and row address R1) for a read command of the thread A, issues a sensing command including designation of the ADL 47 and the row address R1, and supplies the sensing command to the nonvolatile memory 21 (S71). When the nonvolatile memory 21 becomes a ready state from a busy state, the controller 25 issues an inter-latch transfer command including designation of designation of the ADL 47, and supplies the inter-latch transfer command to the nonvolatile memory 21 (S72). When the nonvolatile memory 21 becomes the ready state from the busy state, the controller 25 issues a data transfer command including the column address C1, and supplies the data transfer command to the nonvolatile memory 21 (S73). In accordance with this, the controller 25 receives read data from the nonvolatile memory 21 and transmits the read data to the host system 10 (S74).

The controller 25 converts a logical address A11 into a physical address (column address C11 and row address R11) for a read command of the thread B, issues a sensing command including designation of the BDL 48 and the row address R11, and supplies the sensing command to the nonvolatile memory 21 (S75). When the nonvolatile memory 21 becomes the ready state from the busy state, the controller 25 issues an inter-latch transfer command including designation of designation of the BDL 48, and supplies the inter-latch transfer command to the nonvolatile memory 21 (S76). When the nonvolatile memory 21 becomes the ready state from the busy state, the controller 25 issues a data transfer command including the column address C11, and supplies the data transfer command to the nonvolatile memory 21 (S77). In accordance with this, the controller 25 receives read data from the nonvolatile memory 21 and transmits the read data to the host system 10 (S78).

The controller 25 converts a logical address A2 into a physical address (column address C2 and row address R1) for a read command of the thread A, issues an inter-latch transfer command including designation of designation of the ADL 47, and supplies the inter-latch transfer command to the nonvolatile memory 21 (S79). When the nonvolatile memory 21 becomes the ready state from the busy state, the controller 25 issues a data transfer command including the column address C2, and supplies the data transfer command to the nonvolatile memory 21 (S80). In accordance with this, the controller 25 receives read data from the nonvolatile memory 21 and transmits the read data to the host system 10 (S81).

The controller 25 converts a logical address A12 into a physical address (column address C12 and row address R11) for a read command of the thread B, issues an inter-latch transfer command including designation of designation of the BDL 48, and supplies the inter-latch transfer command to the nonvolatile memory 21 (S82). When the nonvolatile memory 21 becomes the ready state from the busy state, the controller 25 issues a data transfer command including the column address C2, and supplies the data transfer command to the nonvolatile memory 21 (S83). In accordance with this, the controller 25 receives read data from the nonvolatile memory 21 and transmits the read data to the host system 10 (S84).

The controller 25 converts a logical address A3 into a physical address (column address C3 and row address R1) for a read command of the thread A, issues an inter-latch transfer command including designation of designation of the ADL 47, and supplies the inter-latch transfer command to the nonvolatile memory 21 (S85). When the nonvolatile memory 21 becomes the ready state from the busy state, the controller 25 issues a data transfer command including the column address C3 and supplies the data transfer command to the nonvolatile memory 21 (S86). In accordance with this, the controller 25 receives read data from the nonvolatile memory 21 and transmits the read data to the host system 10 (S87).

The controller 25 converts a logical address A13 into a physical address (column address C13 and row address R11) for a read command of the thread B, issues an inter-latch transfer command including designation of designation of the BDL 48, and supplies the inter-latch transfer command to the nonvolatile memory 21 (S88). When the nonvolatile memory 21 becomes the ready state from the busy state, the controller 25 issues a data transfer command including the column address C13 and supplies the data transfer command to the nonvolatile memory 21 (S89). In accordance with this, the controller 25 receives read data from the nonvolatile memory 21 and transmits the read data to the host system 10 (S90).

The controller 25 converts a logical address A4 into a physical address (column address C4 and row address R1) for a read command of the thread A, issues an inter-latch transfer command including designation of designation of the ADL 47, and supplies the inter-latch transfer command to the nonvolatile memory 21 (S91). When the nonvolatile memory 21 becomes the ready state from the busy state, the controller 25 issues a data transfer command including the column address C4 and supplies the data transfer command to the nonvolatile memory 21 (S92). In accordance with this, the controller 25 receives read data from the nonvolatile memory 21 and transmits the read data to the host system 10 (S93).

The controller 25 converts a logical address A14 into a physical address (column address C14 and row address R11) for a read command of the thread B, issues an inter-latch transfer command including designation of designation of the BDL 48, and supplies the inter-latch transfer command to the nonvolatile memory 21 (S94). When the nonvolatile memory 21 becomes the ready state from the busy state, the controller 25 issues a data transfer command including the column address C14 and supplies the data transfer command to the nonvolatile memory 21 (S95). In accordance with this, the controller 25 receives read data from the nonvolatile memory 21 and transmits the read data to the host system 10 (S96).

Figure 12:
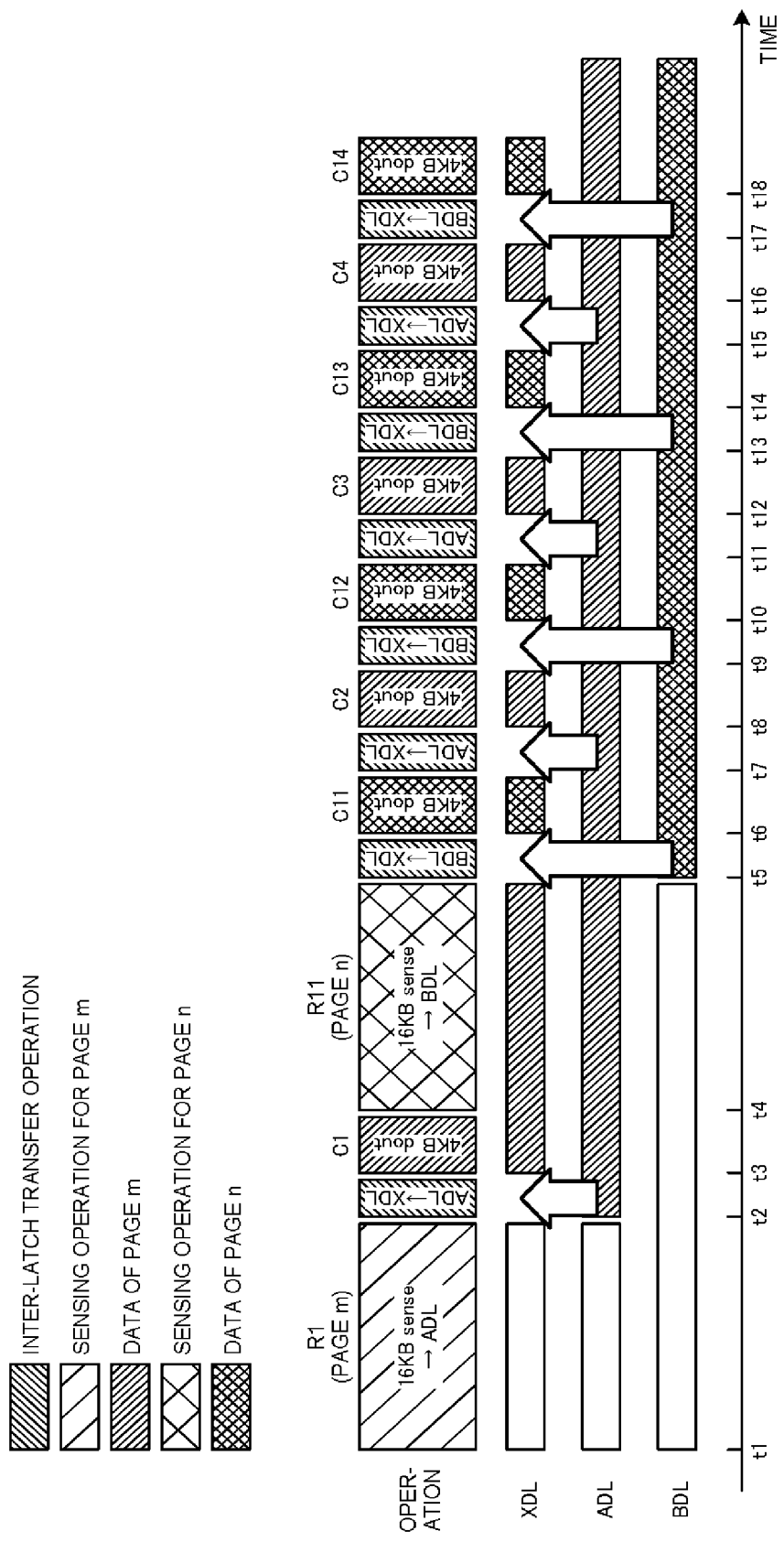
FIG. 12 is a diagram illustrating operation of a nonvolatile memory in the embodiment.

Operation of the memory chip 40 with respect to the processing in S71 to S96 is as illustrated in FIG. 12. FIG. 12 is a diagram illustrating the operation of the nonvolatile memory 21.

At timing t1, the nonvolatile memory 21 stores, in the ADL 47, data of 16 KB that has been read by sensing operation from a page m corresponding to the row address R1 in the memory cell array 50 in accordance with a sensing command (ADL, R1).

At timing t2, the nonvolatile memory 21 transfers the data of 16 KB stored in the ADL 47 to the XDL 49, in accordance with an inter-latch transfer command (ADL).

At timing t3, the nonvolatile memory 21 outputs, to the controller 25, addressed data of 4 KB out of the data of 16 KB (e.g., data of first 4 KB out of 16 KB) stored in the XDL 49 in accordance with a data transfer command (C1) via the input/output signal line 31b.

At the timing t4, the nonvolatile memory 21 stores, in the BDL 48, the data of 16 KB data that has been read by the sensing operation from a page n corresponding to the row address R11 in the memory cell array 50 in accordance with a sensing command (BDL, R11).

At timing t5, the nonvolatile memory 21 transfers the data of 16 KB data stored in the BDL 48 to the XDL 49, in accordance with an inter-latch transfer command (BDL).

At timing t6, the nonvolatile memory 21 outputs, to the controller 25, addressed data of 4 KB out of the data of 16 KB (e.g., data of first 4 KB out of 16 KB) stored in the XDL 49 in accordance with a data transfer command (C11) via the input/output signal line 31b.

At timing t7, the nonvolatile memory 21 transfers the data of 16 KB stored in the ADL 47 to the XDL 49, in accordance with the inter-latch transfer command (ADL).

At timing t8, the nonvolatile memory 21 outputs, to the controller 25, addressed data of 4 KB out of the data of 16 KB stored in the XDL 49 in accordance with a data transfer command (C2) via the input/output signal line 31b.

At timing t9, the nonvolatile memory 21 transfers the data of 16 KB data stored in the BDL 48 to the XDL 49, in accordance with the inter-latch transfer command (BDL).

At timing t10, the nonvolatile memory 21 outputs, to the controller 25, addressed data of 4 KB out of the data of 16 KB stored in the XDL 49 in accordance with a data transfer command (C12) via the input/output signal line 31b.

At timing t11, the nonvolatile memory 21 transfers the data of 16 KB stored in the ADL 47 to the XDL 49, in accordance with the inter-latch transfer command (ADL).

At timing t12, the nonvolatile memory 21 outputs, to the controller 25, addressed data of 4 KB out of the data of 16 KB stored in the XDL 49 in accordance with a data transfer command (C3) via the input/output signal line 31b.

At timing t13, the nonvolatile memory 21 transfers the data of 16 KB data stored in the BDL 48 to the XDL 49, in accordance with the inter-latch transfer command (BDL).

At timing t14, the nonvolatile memory 21 outputs, to the controller 25, addressed data of 4 KB out of the data of 16 KB stored in the XDL 49 in accordance with a data transfer command (C13) via the input/output signal line 31b.

At timing t15, the nonvolatile memory 21 transfers the data of 16 KB stored in the ADL 47 to the XDL 49, in accordance with the inter-latch transfer command (ADL).

At timing t16, the nonvolatile memory 21 outputs, to the controller 25, addressed data of 4 KB out of the data of 16 KB (e.g., data of last 4 KB out of 16 KB) stored in the XDL 49 in accordance with a data transfer command (C4) via the input/output signal line 31b.

At timing t17, the nonvolatile memory 21 transfers the data of 16 KB data stored in the BDL 48 to the XDL 49, in accordance with the inter-latch transfer command (BDL).

At timing t18, the nonvolatile memory 21 outputs, to the controller 25, addressed data of 4 KB out of the data of 16 KB (e.g., data of last 4 KB out of 16 KB) stored in the XDL 49 in accordance with a data transfer command (C14) via the input/output signal line 31b.

Figure 13:
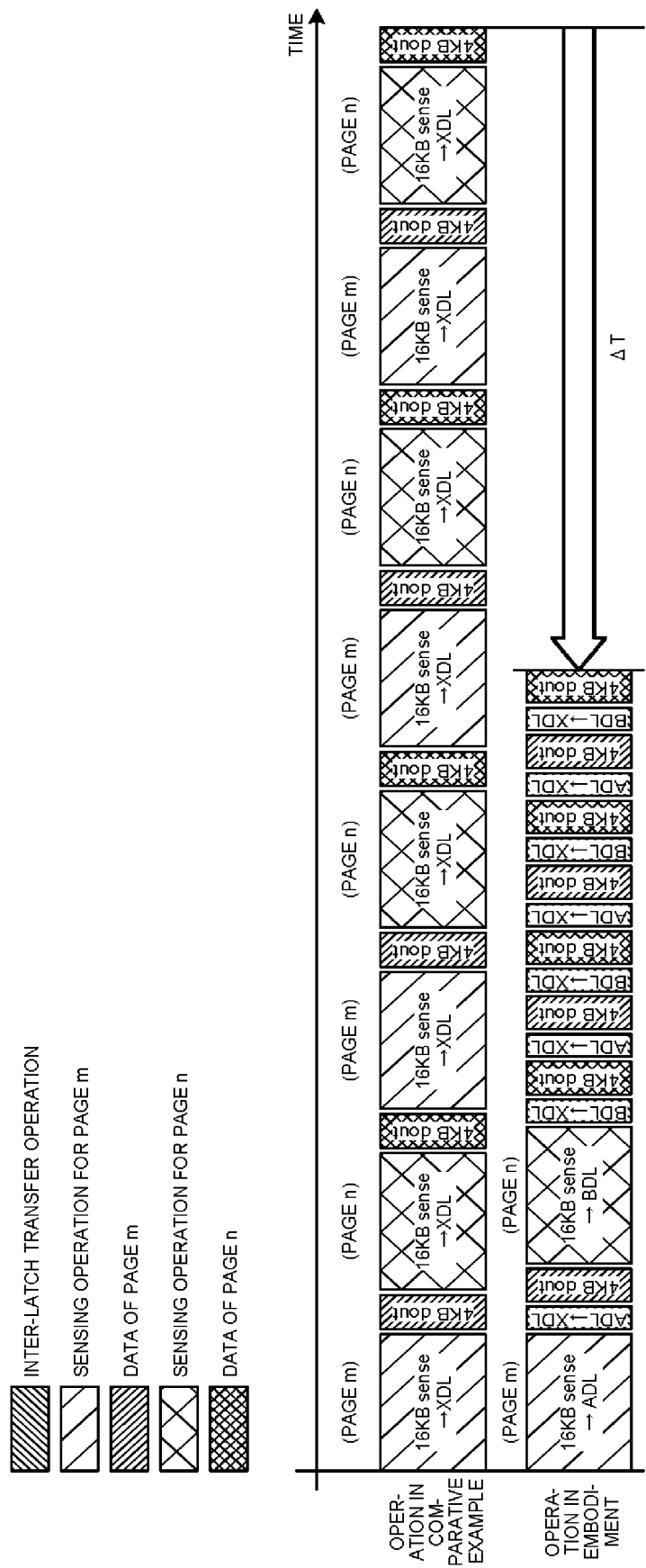
FIG. 13 is a diagram illustrating a command processing time in the embodiment.

As illustrated in FIG. 12, in the embodiment, the read processing using the intermediate buffers (ADL 47 and BDL 48) and the input/output buffer (XDL 49) is performed. In other words, as for each of read commands received in parallel with respect to a plurality of threads, in a case where a page address of target data is identical to a page address of data stored in the intermediate buffer (ADL 47 or BDL 48), cache processing utilizing both the intermediate buffers (ADL 47 and BDL 48) and the input/output buffer (XDL 49) is performed. Consequently, the read processing is performed while reusing the data of the intermediate buffers (ADL 47 and BDL 48). As a result, read data can be transferred from the nonvolatile memory 21 to the controller 25 while the number of times executing the sensing operation can be substantially minimized even in the case of receiving the plurality of read commands in parallel with respect to the plurality of threads. For example, in the case of FIG. 12, in a case where a thread using the ADL 47 and a thread using the BDL 48 are alternately received, the number of times of the sensing operation can be substantially minimized to twice for eight times of read data transfer from the nonvolatile memory 21 to the controller 25. Comparing this with a comparative example in viewpoint of command processing time, the comparison result is as illustrated in FIG. 13. FIG. 13 is a diagram illustrating the command processing time. The comparative example illustrated in FIG. 13 is a case same as the case where the branch in S3 of FIG. 7 is constantly No, and operation is performed to execute read processing using the input/output buffer (XDL 49) without using the intermediate buffers (ADL 47 and BDL 48). Therefore, in the comparative example (in other words, in the case where the branch in S3 of FIG. 7 is constantly No), the sensing operation is performed for every read data transfer. In the case of FIG. 13, the number of times of the sensing operation is eight times for the eight times of read data transfer from the nonvolatile memory 21 to the controller 25. In the comparative example, for a plurality of read commands received in parallel with respect to a plurality of threads, a processing time from when the nonvolatile memory 21 receives a first command until processing for a last command is completed (total processing time for the plurality of commands of the plurality of threads) is likely to be long due to the large number of times executing the sensing operation and the like. Compared with the comparative example, in a case where a page address of data is identical to a page address of data stored in each of the intermediate buffers, the number of times executing the sensing operation is much reduced in the present embodiment by reusing data of the intermediate buffers (ADL 47 and BDL 48), and the total processing time for the plurality of commands of the plurality of threads can be shortened. For example, in the present embodiment, since the number of times of the sensing operation can be minimized to twice for the eight times of read data transfer, the total processing time of the plurality of commands of the plurality of threads is shortened by AT. Note that, in the comparative example, it is possible to consider a second comparative example in which cache processing relating to the XDL 49 is added. In the second comparative example, the number of times of the sensing operations can be reduced for sequential read accesses of a single thread, but the number of times of the sensing operation is much increased for sequential read accesses of a plurality of threads because thrashing occurs among the plurality of threads in caching in the XDL 49. Therefore, even compared with the second comparative example, the total processing time for the plurality of commands of the plurality of threads can be also shortened in the present embodiment.

As described above, in the embodiment, the nonvolatile memory 21 allocates the plurality of intermediate buffers (e.g., ADL 47 and BDL 48) to the plurality of threads, and stores data in an intermediate buffer, out of the plurality of intermediate buffers, explicitly designated by a command, and then transfers and outputs the data to the input/output buffer from the intermediate buffer explicitly designated by the command. Consequently, the read operation can be easily accelerated for the sequential read commands of the plurality of threads. Therefore, even in sequential read for the plurality of threads, there is no extra sensing operation caused by thrashing of sense results, and high performance is exerted. Alternatively, as for the read buffer 26c of the controller 25, it is possible to reduce a capacity necessary to exert equivalent performance.

Additionally, in the embodiment, since the read processing for the plurality threads is accelerated by utilizing the intermediate buffers (e.g., ADL 47 and BDL 48) used in the program operation of the memory cells, it is possible to easily achieve both cost reduction and performance improvement of the nonvolatile memory 21.

Note that, while the case where each memory chip includes a single plane and the read processing is performed by single plane reading has been exemplified, the concept of the present embodiment may also be applied to a case where each memory chip includes a plurality of planes accessible in parallel and the read processing is performed by multi-plane reading.

Alternatively, the concept of the present embodiment may be applied to swap processing between ADL 47/BDL 48 and XDL 49. Consequently, compared with a case of not using the intermediate buffers, a data capacity of the input/output buffer (XDL 49) is virtually increased.

Alternatively, as a case where reusability of data of the intermediate buffer is higher than the predetermined reusability for each thread in S3 of FIG. 7, for example, sequential read, background read (such as compaction read or patrol read) are exemplified, but in addition thereto, random read for data having a read size larger than 4 KB may also be included.

Alternatively, even in the case where it is determined as No in S3 of FIG. 7, the processing may jump to S12 or S17 in a case where there is a possibility that data addressed by a read command or a background read process request is stored in the intermediate buffer (e.g., ADL 47 or BDL 48).

Alternatively, various algorithms may be used as specific algorithms to determine the read command sequentiality exemplified in S3 of FIG. 7.

For example, as a first modified example of the embodiment, algorithms illustrated in FIGS. 14A to 16 may be used in S3 of FIG. 7. FIGS. 14A and 14B are schematic diagrams to describe algorithms to determine read command sequentiality in the first modified example of the embodiment. FIGS. 15A to 15G are diagrams to describe operation to determine sequentiality in the first modified example of the embodiment. FIG. 16 is a flowchart to describe an updating procedure of a sequentiality determination table in the first modified example of the embodiment.

First, an outline of an algorithm to determine read command sequentiality will be described with reference to FIGS. 14A and 14B. FIGS. 14A and 14B illustrate a start LBA and the transfer length of data (hereinafter referred to as data A to data E) for which reading is requested by read commands A to E.

The controller 25 of the memory system 1 determines sequentiality of the read commands by using the start LBA received from the host I/F 29 and the transfer length. The controller 25 stores a reference start LBA of data requested by read commands having an identical stream ID. In other words, in the example illustrated in FIG. 14A, the controller 25 stores, as the reference start LBA, the start LBA of the data A requested to be read. The controller 25 stores the cumulative length of the transfer length of read commands respectively requesting: the data B having an LBA range consecutive with an LBA range of the data A; the data C having an LBA range consecutive with the LBA range of the data B; the data D having an LBA range consecutive with the LBA range of the data C; and the data E having an LBA range consecutive with the LBA range of the data D. Then, when the cumulative length reaches a preset sequentiality determination threshold value or more by receiving the read command that requests reading of the data D, the controller 25 determines that sequentiality of the data for which reading is requested by the read commands is higher than the predetermined threshold.

Depending on a situation of transferring read commands of the host system 10, the controller 25 of the memory system 1 may not always receive data requested by the read commands having the high sequentiality in the order of LBAs. In the example illustrated in FIG. 14B, the controller 25 receives read commands requesting data reading in the order of the data B, the data A, the data C, the data D, and the data E. In the present embodiment, by using the algorithm described in FIG. 16, the controller 25 may also determine sequentiality of the read commands thus received.

Next, exemplary operation to determine sequentiality will be described with reference to FIGS. 15A to 15G. The sequentiality determination table is implemented in the controller 25. The controller 25 determines read command sequentiality by using the sequentiality determination table.

The sequentiality determination table includes a plurality of entries. In the first modified example, the sequentiality determination table includes three entries. Each entry includes a start LBA, a last LBA, the cumulative length, and a generation number. Additionally, the sequentiality determination table includes a sequentiality determination flag. The sequentiality determination table is managed per stream ID. In other words, one sequentiality determination table exists per stream ID. The sequentiality determination table may be initialized by the controller 25 when a stream ID is allocated in accordance with a stream control command (see FIG. 9).

In the following description, it is assumed that 0x700 is set as the sequentiality determination threshold value.

FIG. 15A illustrates a state in which the sequentiality determination table is initialized. The start LBA, the last LBA, the cumulative length, and the generation number in all of the entries are zero although not illustrated in the drawing. The sequentiality determination flag is not set.

FIG. 15B illustrates a state of the sequentiality determination table at the time of receiving a read command A having the transfer length=0x200 sectors from the start LBA=0x1000 in the state of FIG. 15A. In an entry 0, the last LBA becomes 0x11FF because the start LBA is 0x1000 and the last LBA is "start LBA+the transfer length−1". In the entry 0, the cumulative length becomes 0x200 obtained by adding the transfer length (0x200) of the read command A to the existing cumulative length (0x000). The generation number in the entry in which command information is newly registered becomes 1. In other words, the generation number in the entry 0 becomes 1.

FIG. 15C illustrates a state of the sequentiality determination table at the time of receiving a read command B having the transfer length=0x100 sectors from the start LBA=0x1200 in the state of FIG. 15B. The start LBA of the read command B is consecutive with the last LBA in the entry 0. Therefore, information of the read command B is registered in the entry 0. The start LBA in the entry 0 remains as 0x1000, and the last LBA becomes 0x12FF that is the last LBA of the read command B. The cumulative length in the entry 0 becomes 0x300 obtained by adding the transfer length (0x100) of the read command B to the existing cumulative length (0x200). The generation number in the entry having the LBA range consecutive with the LBA range of the received command becomes 1. In other words, the generation number in the entry 0 remains as 1.

FIG. 15D illustrates a state of the sequentiality determination table at the time of receiving a read command C having the transfer length=0x200 sectors from the start LBA=0x1400 in the state of FIG. 15C. The start LBA of the read command C is consecutive with the final LBA in the entry 0. At this time, information of the read command C is registered in the entry 1. In the entry 1, the start LBA becomes 0x1400 and the last LBA becomes 0x15FF. The cumulative length in the entry 1 becomes 0x200 obtained by adding the transfer length (0x200) of the read command C to the existing cumulative length (0x000). The generation number in the entry in which the command information is newly registered becomes 1. In other words, the generation number in the entry 1 becomes 1. Among the entries other than the entry having the command information newly registered, in an entry in which the cumulative length is not zero, the generation number is incremented by one. In other words, the generation number in the entry 0 becomes 2.

FIG. 15E illustrates a state of the sequentiality determination table at the time of receiving a read command D having the transfer length=0x100 sectors from the start LBA=0x0E00 in the state of FIG. 15D. The start LBA of the read command D is consecutive with neither the last LBA in the entry 0 nor the last LBA in the entry 1. At this time, information of the read command D is registered in the entry 2. In the entry 2, the start LBA becomes 0x0E00 and the last LBA becomes 0x0EFF. The cumulative length in the entry 2 becomes 0x100 obtained by adding the transfer length (0x100) of the read command D to the existing cumulative length (0x000). The generation number in the entry in which the command information is newly registered becomes 1. In other words, the generation number in the entry 2 becomes 1. Among the entries other than the entry having the command information newly registered, in an entry in which the cumulative length is not zero, the generation number is incremented by one. In other words, the generation number in the entry 0 becomes 3. The generation number in the entry 1 becomes 2.

FIG. 15F illustrates a state of the sequentiality determination table at the time of receiving a read command E having the transfer length=0x100 sectors from the start LBA=0x1300 in the state of FIG. 15E. The start LBA of the read command E is consecutive with the last LBA in the entry 0. Also, the last LBA of the read command E is consecutive with the start LBA in the entry 1. At this time, information in the entry 0, information in the entry 1, and information of the read command E are merged and registered in an entry having a smaller start LBA, that is, the entry 0. The start LBA in the entry 0 remains as 0x1000. The last LBA in the entry 0 becomes 0x15FF that has been the last LBA in the entry 1. The cumulative length in the entry 0 becomes 0x600 obtained by adding the cumulative length (0x200) in the entry 1 and the transfer length (0x100) of the command E to the existing cumulative length (0x300). Among the merged entries, a generation number of an entry having a smaller start LBA becomes 1. In other words, the generation number in the entry 0 becomes 1. Among the merged entries, an entry having a larger start LBA is initialized to zero. In other words, the entry 1 is initialized. As for entries in each of which the cumulative length is not zero among the entries other than the merged entries, the generation numbers are sequentially allocated with 2, 3, . . . from an entry having a smaller generation number. In other words, the generation number in the entry 2 is rewritten from 1 to 2.

FIG. 15G illustrates a state of the sequentiality determination table at the time of receiving a read command F having the transfer length=0x100 sectors from the start LBA=0x0F00 in the state of FIG. 15F. The start LBA of the read command F is consecutive with the last LBA in the entry 2. Also, the last LBA of the read command F is consecutive with the start LBA in the entry 0. At this time, information in the entry 0, information in the entry 2 and information of the read command F are merged and registered in an entry having a smaller start LBA, that is, the entry 2. The start LBA in the entry 2 remains as 0x0E00. The last LBA in the entry 2 becomes 0x15FF that has been the last LBA in the entry 0. The cumulative length in the entry 2 becomes 0x800 obtained by adding the cumulative length (0x600) in the entry 0 and the transfer length (0x100) of the command F to the existing cumulative length (0x100). Among the merged entries, a generation number in an entry having a smaller start LBA becomes 1. In other words, the generation number in the entry 2 becomes 1. Among the merged entries, an entry having a larger start LBA is initialized to zero. In other words, the entry 0 is initialized.

Here, since the cumulative length in the entry 2 has reached the sequentiality determination threshold value (0x700) or more, the sequentiality determination flag is set.

In a case where an LBA range of a received command is non-consecutive with the start LBA or the last LBA in any of the entries when the cumulative length in none of the entries is zero, the entry having the highest generation number is initialized. In this case, note that an entry having the shortest cumulative length may also be initialized. Then, information of the received command is registered in the initialized entry.

Next, an updating procedure of the sequentiality determination table by the controller 25 will be described with reference to FIG. 16.

When a read command is received (S300), the controller 25 checks whether there is any entry in which cumulative length is not zero and a start LBA or a last LBA is consecutive with an LBA range of the received command (S301).

In a case where there is no entry in which the LBAs are consecutive (S301: No), the controller 25 checks whether there is any entry in which the cumulative length is zero (S302). In a case where there is an entry in which the cumulative length is zero (S302: Yes), the controller 25 registers command information in an entry having a smallest entry number among the entries in which the cumulative length is zero (S303). At this time, the generation number in the entry is set to 1. After that, S307 described later is performed. In a case where there is no entry in which the cumulative length is zero (S302: No), the controller 25 initializes an entry having the largest generation number or an entry having shortest cumulative length (S304). After that, S303 is performed as described above.

In a case where there is an entry in which the LBAs are consecutive (S301: Yes), the controller 25 checks whether there is any mergeable entry (S305). In other words, it is checked whether there are both an entry (first entry) having a last LBA consecutive with the start LBA of the received command and an entry (second entry) having a start LBA consecutive with the last LBA of the received command.

In a case where there is no mergeable entry, in other words, in a case where there is only one of the first entry and the second entry (S305: No), the controller 25 registers the command information in the first entry or the second entry (S306). Specifically, in a first case where the command information is registered in the first entry, the start LBA in the first entry is not changed, and the last LBA of the received command is registered in the last LBA in the first entry. On the other hand, in a second case where the command information is registered in the second entry, the start LBA of the received command is registered in the start LBA in the second entry, and the last LBA in the second entry is not changed. In both the first case and the second case, the cumulative length in the entry is added with the transfer length of the received command, and the generation number in the entry is set to 1. Furthermore, an entry in which the cumulative length is not zero among entries that are not registration targets, the generation number is incremented by one (S307). After that, S310 described later is performed.

In a case where there is a mergeable entry, in other words, in a case where there are both the first entry and the second entry (S305: Yes), the controller 25 merges and registers, in the first entry, information in the second entry and command information (S308). In other words, the start LBA in the first entry is not changed. The last LBA in the second entry is registered in the last LBA in the first entry. In the cumulative length in the first entry, a value obtained by adding the transfer length of the received command to the sum of the cumulative length in the first entry and the cumulative length in the second entry is registered. The generation number in the first entry is changed to 1. Additionally, as for entries in which the cumulative length is not zero among entries that are not merging targets, generation numbers are allocated again with 2, 3, . . . in the order of having a smaller generation number (S309).

In both a case where there is no mergeable entry (S305: No) and a case where there is a mergeable entry (S305: Yes), there is a case where there are two or more first entries or a case where there are two or more second entries. In this case, for example, the controller 25 selects one of the existing two or more first entries (or the existing two or more second entries) and performs the above-described processing.

Next, the controller 25 checks whether the cumulative length in any entry has reached the sequentiality determination threshold value or more (S310). In a case where there is no such an entry (S310: No), the controller 25 terminates the processing, and in a case where there is such an entry (S310: Yes), the controller 25 sets a sequentiality determination flag (S311). After that, the processing is terminated. As a result, the stream in which the sequentiality determination flag has been set (and a read command group belonging to the stream) is determined to have sequentiality.

Alternatively, even in a situation in which the host does not attach any stream ID to a read command, the memory system may categorize the read command into any one of one or more sequential streams by determining consecutiveness of an address of the read command. For example, as the second modified example of the embodiment, an algorithm illustrated in FIGS. 14A and 14B, FIG. 16, and FIGS. 17A to 17H may be used in S3 of FIG. 7. FIGS. 17A to 17H are diagrams to describe operation to determine sequentiality in the second modified example of the embodiment. FIGS. 14A and 14B are the schematic diagrams to describe the algorithm to determine read command sequentiality in the first modified example of the embodiment, and also applicable to the second modified example. FIG. 16 is the flowchart to describe the updating procedure of the sequentiality determination table in the first modified example of the embodiment, and also applicable to the second modified example.

Also in the second modified example, the controller 25 determines sequentiality by using a start LBA received from the host I/F 29 and the transfer length in a manner similar to the first modified example. The algorithm used to determine sequentiality is similar to the algorithm in the first modified example. In other words, when the cumulative length of data sequentially consecutive from the reference start LBA reaches the sequentiality determination threshold value or more, the controller 25 determines that sequentiality of this data is higher than the predetermined threshold. In the second modified example, the controller 25 attaches a stream ID to a read command determined to have high sequentiality.

In the first modified example, one sequentiality determination table exists for one stream ID. By contrast, in the second modified example, read command sequentiality is determined by one sequentiality determination table implemented in the controller 25.

FIGS. 17A to 17H are the diagrams to describe exemplary operation to determine sequentiality in the second modified example of the embodiment. The sequentiality determination table includes a plurality of entries. In the second modified example, the sequentiality determination table includes three entries. One entry includes a start LBA, a last LBA, the cumulative length, a generation number, and a stream ID. The sequentiality determination table may be initialized by the controller 25 at any timing. In the following description, it is assumed that 0x700 is set as the sequentiality determination threshold value.

FIG. 17A illustrates a state in which the sequentiality determination table is initialized. Although not illustrated in the drawing, the start LBA, the last LBA, the cumulative length, the generation number, and the stream ID in all of entries are zero.

Since FIGS. 17B to 17F are similar to FIGS. 15B to 15F respectively, a description thereof will be omitted here.

FIG. 17G illustrates a state of the sequentiality determination table at the time of receiving a read command F having the transfer length=0x200 sectors from the start LBA=0x2000 in the state of FIG. 17F. The start LBA of the read command F is not consecutive with the last LBA in the entry 0 and the last LBA in the entry 2. At this time, information of the read command F is registered in the entry 1. In the entry 1, the start LBA becomes 0x2000 and the last LBA becomes 0x21FF. The cumulative length in the entry 1 becomes 0x200 obtained by adding the transfer length (0x200) of the read command F to the existing cumulative length (0x000). The generation number in the entry in which command information is newly registered becomes 1. In other words, the generation number in the entry 1 becomes 1. Among the entries other than the entry having the command information newly registered, in an entry in which the cumulative length is not zero, the generation number is incremented by one. In other words, the generation number in the entry 0 becomes 2, and the generation number in the entry 2 becomes 3.

FIG. 17H illustrates a state of the sequentiality determination table at the time of receiving a read command G having the transfer length=0x100 sectors from the start LBA=0x0F00 in the state of FIG. 17G. The start LBA of the read command G is consecutive with the last LBA in the entry 2. Also, the last LBA of the read command F is consecutive with the start LBA in the entry 0. At this time, the information in the entry 0, the information in the entry 2, and information of the command F are merged and registered in an entry having a smaller start LBA, that is, the entry 2. The start LBA in the entry 2 remains as 0x0E00. The last LBA in the entry 2 becomes 0x15FF that has been the last LBA in the entry 0. The cumulative length in the entry 2 becomes 0x800 obtained by adding the cumulative length (0x600) in the entry 0 and the transfer length (0x100) of the command F to the existing cumulative length (0x100). Among the merged entries, a generation number in an entry having a smaller start LBA becomes 1. In other words, the generation number in the entry 2 becomes 1. Among the merged entries, an entry having a larger start LBA is initialized to zero. In other words, the entry 0 is initialized. As for entries in each of which the cumulative length is not zero among the entries other than the merged entries, the generation numbers are sequentially allocated with 2, 3, . . . from an entry having a smaller generation number. In other words, the generation number in the entry 1 is rewritten from 1 to 2.

Here, since the cumulative length in the entry 2 has reached the sequentiality determination threshold value (0x700) or more, a stream ID is allocated to the entry 2. Any number may be allocated to the stream ID, and 1 is allocated. The stream ID is allocated to data belonging to the entry to which the stream ID is allocated.

No stream ID is allocated to data belonging to an entry in which the cumulative length is less than the sequentiality determination threshold value. For example, no stream ID is allocated to random read data. In other words, the controller 25 of the second modified example separates a read command of stream data and a read command of random read data from a plurality of received read commands.

Also in the entry 1, a different stream ID (e.g., 2) is allocated when the cumulative length reaches the sequentiality determination threshold value or more by receiving a subsequent read command. In other words, in the controller 25 of the second modified example, even though the host does not attach any stream ID to a read command, read commands of multiple pieces of stream data are extracted from a plurality of received read commands, and different stream IDs may be allocated to the read commands respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory including a memory cell array, an input/output buffer, and a plurality of intermediate buffers each electrically connected between the memory cell array and the input/output buffer, the memory cell array including a plurality of pages, the plurality of pages including at least a first page and a second page, the second page being different from the first page, the plurality of intermediate buffers including at least a first intermediate buffer and a second intermediate buffer, the second intermediate buffer being different from the first intermediate buffer; and
a controller electrically connected to the nonvolatile memory and configured to:
by transmitting, to the nonvolatile memory, a first command sequence that includes a first sensing operation instruction, designation of the first intermediate buffer, and designation of the first page, instruct the nonvolatile memory to store first data read through a sensing operation from the first page into the first intermediate buffer; and
by transmitting, to the nonvolatile memory, a second command sequence that includes a second sensing operation instruction, designation of the second intermediate buffer, and designation of the second page, instruct the nonvolatile memory to store second data read through a sensing operation from the second page into the second intermediate buffer.

2. The memory system according to claim 1, wherein a period during which the first data is in the first intermediate buffer and a period during which the second data is in the second intermediate buffer overlap each other.

3. The memory system according to claim 1, wherein the controller is further configured to:
  by transmitting, to the nonvolatile memory, a third command sequence that includes a transfer instruction and designation of the first intermediate buffer, instruct the nonvolatile memory to transfer at least first part of the first data stored in the first intermediate buffer to the input/output buffer.

4. The memory system according to claim 3, wherein the controller is further configured to:
  by transmitting, to the nonvolatile memory, a fourth command sequence that includes an output instruction, instruct the nonvolatile memory to output the first part of the first data from the input/output buffer.

5. The memory system according to claim 4, wherein the controller is further configured to:
  by transmitting, to the nonvolatile memory, a fifth command sequence that includes a transfer instruction and designation of the second intermediate buffer, instruct the nonvolatile memory to transfer at least first part of the second data stored in the second intermediate buffer to the input/output buffer.

6. The memory system according to claim 5, wherein the controller is further configured to:
  by transmitting, to the nonvolatile memory, a sixth command sequence that includes an output instruction, instruct the nonvolatile memory to output the first part of the second data from the input/output buffer.

7. The memory system according to claim 6, wherein the controller is further configured to:
  without transmitting the first sensing operation instruction again, by transmitting, to the nonvolatile memory, a seventh command sequence that includes a transfer instruction and designation of the first intermediate buffer, instruct the nonvolatile memory to transfer second part of the first data stored in the first intermediate buffer to the input/output buffer; and
  without transmitting the second sensing operation instruction again, by transmitting, to the nonvolatile memory, an eighth command sequence that includes a transfer instruction and designation of the second intermediate buffer, instruct the nonvolatile memory to transfer second part of the second data stored in the second intermediate buffer to the input/output buffer.

8. The memory system according to claim 1, wherein the controller is further configured to use each of the plurality of intermediate buffers in a program operation performed for each of the plurality of pages.

9. The memory system according to claim 1, wherein the nonvolatile memory further includes a sense amplifier circuit,
  wherein one of the plurality of intermediate buffers is electrically connected to the sense amplifier circuit and to the input/output buffer.

10. The memory system according to claim 1, wherein the nonvolatile memory further includes an input/output interface,
  wherein the input/output buffer is electrically connected to the input/output interface and to one of the plurality of intermediate buffers.

11. A memory system comprising:
  a nonvolatile memory including a memory cell array, an input/output buffer, and one or more intermediate buffers each electrically connected between the memory cell array and the input/output buffer, the memory cell array including a plurality of pages, the plurality of pages including at least a first page and a second page, the second page being different from the first page, the one or more intermediate buffers including at least a first intermediate buffer; and
  a controller electrically connected to the nonvolatile memory and configured to:
    by transmitting, to the nonvolatile memory, a first command sequence that includes a first sensing operation instruction, designation of the first page, and designation of the first intermediate buffer, instruct the nonvolatile memory to store first data read through a sensing operation from the first page into the first intermediate buffer;
    by transmitting, to the nonvolatile memory, a second command sequence that includes a second sensing operation instruction, designation of the second page, but does not include designation of any of the intermediate buffers, instruct the nonvolatile memory to store second data read through a sensing operation from the second page into the input/output buffer; and
    by transmitting, to the nonvolatile memory, a third command sequence that includes an output instruction, instruct the nonvolatile memory to output data from the input/output buffer.

12. The memory system according to claim 11, wherein the one or more intermediate buffers further include a second intermediate buffer different from the first intermediate buffer, and the plurality of pages further include a third page, and
  the controller is further configured to:
    by transmitting, to the nonvolatile memory, a fourth command sequence that includes a third sensing operation instruction and designation of the second intermediate buffer, instruct the nonvolatile memory to store third data read through a sensing operation from the third page into the second intermediate buffer.

13. The memory system according to claim 12, wherein the controller is further configured to:
  by transmitting, to the nonvolatile memory, a fifth command sequence that includes a transfer instruction and designation of the second intermediate buffer, instruct the nonvolatile memory to transfer the third data stored in the second intermediate buffer to the input/output buffer.

14. The memory system according to claim 12, wherein the storing of the first data from the first page into the first intermediate buffer is performed during a first period,
  the storing of the third data from the third page into the second intermediate buffer is performed during a second period after the first period, and
  the controller is further configured to:
    by transmitting, to the nonvolatile memory, a sixth command sequence that includes a transfer instruction and designation of the first intermediate buffer during a third period after the first period, instruct the nonvolatile memory to transfer the first data stored in the first intermediate buffer to the input/output buffer; and by transmitting, to the nonvolatile memory, a seventh command sequence that includes a transfer instruction and designation of the second intermediate buffer during a fourth period after the second period, instruct the nonvolatile memory to transfer the third data stored in the second intermediate buffer to the input/output buffer.

15. The memory system according to claim 14, wherein the controller is further configured to:

by transmitting, to the nonvolatile memory, an eighth command sequence that includes an output instruction during a fifth period after the third period and before the fourth period, instruct the nonvolatile memory to output the first data from the input/output buffer; and by transmitting, to the nonvolatile memory, a ninth command sequence that includes an output instruction during a sixth period after the fourth period, instruct the nonvolatile memory to output the third data from the input/output buffer.

16. The memory system according to claim 11, wherein the controller is further configured to:

by transmitting, to the nonvolatile memory, a tenth command sequence that includes a transfer instruction and designation of the first intermediate buffer, instruct the nonvolatile memory to transfer the first data stored in the first intermediate buffer to the input/output buffer.

17. The memory system according to claim 16, wherein the storing of the first data from the first page into the first intermediate buffer is performed during a seventh period, the transferring of the first data from the first intermediate buffer to the input/output buffer is performed during an eighth period after the seventh period, and the controller is further configured to:

by transmitting, to the nonvolatile memory, an eleventh command sequence during a ninth period after the eighth period, instruct the nonvolatile memory to output the first data from the input/output buffer.

18. The memory system according to claim 11, wherein the controller is further configured to use the one or more intermediate buffers in a program operation performed for each of the plurality of pages.

19. The memory system according to claim 11, wherein the nonvolatile memory further includes a sense amplifier circuit, wherein one of the one or more intermediate buffers is electrically connected to the sense amplifier circuit and to the input/output buffer.

20. The memory system according to claim 11, wherein the nonvolatile memory further includes an input/output interface, wherein the input/output buffer is electrically connected to the input/output interface and to one of the one or more intermediate buffers.

* * * * *